United States Patent [19]

Ozer et al.

[11] Patent Number: 4,839,640

[45] Date of Patent: Jun. 13, 1989

[54] ACCESS CONTROL SYSTEM HAVING CENTRALIZED/DISTRIBUTED CONTROL

[75] Inventors: Richard Ozer, Brookline; Edward DeSantis, Boston; Brett Tomlinson, Brighton, all of Mass.

[73] Assignee: ADT Inc., Parsippany, N.J.

[21] Appl. No.: 171,154

[22] Filed: Mar. 17, 1988

Related U.S. Application Data

[63] Continuation of Ser. No. 654,238, Sep. 24, 1984, abandoned.

[51] Int. Cl.[4] .......................... G06F 7/04; G06K 5/00

[52] U.S. Cl. .......................... 340/825.31; 340/825.34; 340/825.08; 235/382

[58] Field of Search ...................... 340/825.34, 825.32, 340/825.31, 825.08; 235/382, 382.5; 370/90, 86, 94, 85

[56] References Cited

U.S. PATENT DOCUMENTS

| | | | |
|---|---|---|---|
| 4,082,922 | 4/1978 | Chu | 370/94 |
| 4,218,690 | 8/1980 | Ulch et al. | 340/825.31 |
| 4,570,257 | 2/1986 | Olson et al. | 370/94 |

OTHER PUBLICATIONS

B. K. Penney and A. A. Baghdadi, *Computer Communications*, vol. 2, No. 4, Aug. 1979, pp. 165–180.

*Primary Examiner*—Robert L. Griffin

*Assistant Examiner*—Ralph E. Smith

*Attorney, Agent, or Firm*—Weingarten, Schurgin, Gagnebin & Hayes

[57] ABSTRACT

The access control system according to the present invention provides for the centralized control of the system operating parameters, including all times, access codes, alarms, error messages, and pass-coded indications. The access control system communicates with a plurality of remote card readers, at which point the user enters a code to gain entry into the protected areas. The access control system according to the present invention selectively stores limited information at each card reader location, wherein access control is still maintained, even if the central data system becomes inoperative. Moreover, the communication between the central data system and the plurality of card readers includes data transfers through a plurality of subsystems, each having a data processing program therein. The system according to the present invention provides for efficient communication between asynchronous operating subsystems through the controlled use of a first-in-first-out (FIFO) data register pair. In this manner, each subsystem according to the present invention operates independently until a data transfer is initiated, causing the other operations to be suspended to permit the transfer of data. The FIFO allows for data to be transferred at different rates between subsystems, allowing freedom in subsystem operation and data transfer rates.

13 Claims, 9 Drawing Sheets

DATA FLOW CHART
TERMINAL MANAGER

DATABASE MANAGER

COMMAND INTERPRETER

TRANSACTION PROCESSOR

TAPE BACKUP/ RESTORE MODULE

ACCESS CONTROL SYSTEM HAVING CENTRALIZED/DISTRIBUTED CONTROL

This application is a continuation of application Ser. No. 654,238, filed Sept. 24, 1984, now abandoned.

FIELD OF THE INVENTION

The present invention relates to security systems, and in particular to security systems having centralized operational control and limited distributed control.

BACKGROUND OF THE INVENTION

The nature of security, or access control, systems favors the centralization of all signal reception and authorization controls. However, in view of the variety of situations which are to be covered by a typical security system, control of all functions directly from a single computer control system becomes unwieldy and impractical for even the most modest systems. Previously, some of the signals could be consolidated in a simple remote module which is connected to the system functions to be controlled, such as door access and alarm signals, as well as being connected to the central system. However, while remote modules allow the hardware to be expanded, the increased data flow causes a further burden on the central processing computer system. Moreover, the entire system becomes vulnerable upon a power failure condition at the central computer. Typically, if the central computer power system goes down and the access to system records is maintained only at the central computer, a user is prevented from being granted entry at the remote unit because access to the database will be suspended during the power-down condition. In addition, breakdown in central/remote communications causes similar problems.

Alternatively, synchronized remote units allow entry to be granted if other remote units fail. However, the flexibility of a practical distributed security system is severely limited, or places a severe requirement on the communication system to be fast and accurate with the data transferred therein. Moreover, the redundancy of data stored among individual remote units for backup is relatively low, or if provided, causes significantly increased costs. Moreover, the format of the interconnection and synchronization of the various access control system elements to transfer data presents a problem to the structure of the communication channels, since the various system elements may operate somewhat independently. Furthermore, if the remote units are communicating to a central unit, the system operations and information exchange rates may be completely independent or at least different, requiring careful synchronization of the system elements or data handshaking protocol to achieve error-free data transfers.

SUMMARY OF THE INVENTION

The access control system of the present invention provides centralized control of various parameters, listed below. The centralized control is accomplished through the central console, which has two functions. The first is to make the system operator aware of alarm conditions as they occur, the operator having an opportunity to respond appropriately. The second function is to provide a convenient method of making changes to the system transaction processing equipment (e.g., issuance of new cards, card cancellations, group reassignments, schedule changes, temporary passes, etc.). This environment is represented internally to the program by a database, and the system provides a substantial repertory of operating commands for maintaining this database.

The system according to the present invention controls access to areas some of which are more tightly controlled than others, having a higher security level. The system therefore provides a hierarchy of security levels. Each entry and exit point to that area has an associated card reader and numeric keypad, enclosed in a single housing hereinafter referred to as a card reader unit. The system according to the present invention governs access to a secure area by granting or denying access requests presented to the respective card reader units. The system responds to a request by keycode alone, request by card alone, or a request by a card followed with a keycode. Typically a card and code are issued to regular employees of the user organization, and the code-only passes are provided to visitors or those who require a temporary access only. The card codes are unique and invisibly encoded in the respective cards. The code consists of two parts, the first identifying user organization and the second identifying individual cardholder. Each card is assigned to one or more particular groups. A group comprises a list of reader units and a respective schedule of times at which the particular cardholder will be successfully acknowledged by the reader units.

The system of the present invention further provides for the grant of access to controlled areas when the central console operation fails by relying on a limited store of information residing in individual card readers of that area.

The individual card readers communicate with the central console system through a polling machine which acquires the card reader data and provides a format of information flow to a first-in-first-out (FIFO) register which communicates with central processing system. The resulting data flow between the central system and the remote reader is rapid as well as efficient in time and hardware costs. Moreover, the transfer allows completely independent and asynchronous operation of each system element.

BRIEF DESCRIPTION OF THE DRAWING

These and further features of the present invention will be better understood by reading the following detailed description, taken together with the drawing, wherein.

DETAILED DESCRIPTION OF THE INVENTION

Hardware

Figure 1:
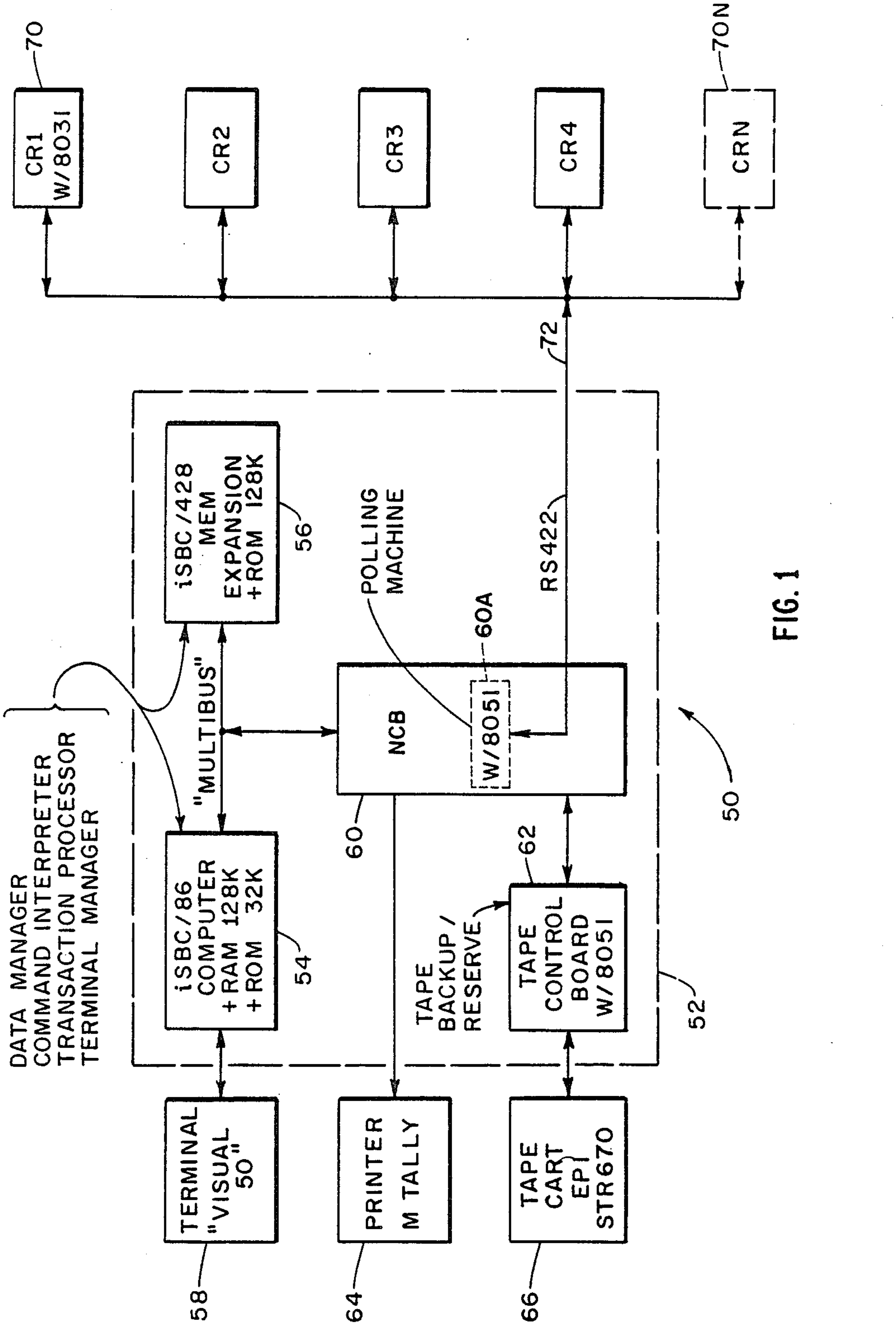
FIG. 1 is a hardware block diagram of one embodiment of the system according to the present invention.

The hardward 50 structure of the system according to the present invention is shown in FIG. 1, wherein the majority of the system is included in a console 52 comprising a computer system. The computer system includes a single board computer 54, typically an iSBC 86/30 computer of Intel, Santa Clara, Calif. 95051, having 128 K of random access memory (RAM) and 32 K of read only memory (ROM). Moreover, the computer further includes an expansion board Intel Model iSBC 428, having a additional 128 K of ROM. The iSBC 86/30 and iSBC 428 are explained in Intel Documents Nos. 144044-001 and 145696-001, incorporated by reference.

Every system console computer 54 includes a battery backup for its RAM, to guard the RAM resident operating database. However, not every system includes a battery backup for general operation, i.e., sufficient to allow normal reader polling to continue during an interruption of AC power.

The system 50 communicates with the console operator through a display terminal 58, typically a model 50, manufactured by Visual Technology of Tewksbury, Mass. The console communicates with the remaining system hardware and software subsystems through a network communications board (NCB) 60 having a tape control board 62 residing thereon. The NCB 60 communicates with a printer 64, typically a Mannesman Tally MT-160. The tape control board, receives control commands and transfers data from the computer system through the NCB 60 to a backup tape cartridge unit 66 manufactured by EPI, Model STR670. The system also receives stored system information from the tape cartridge unit 66 through the tape control board 62 and NCB 60. A plurality of card readers 70 through 70N are connected in parallel to an RS422 data bus 72.

While the computer 54 and the expansion memory 56 use the particular hardware specified above, alternate hardware may be substituted, the associated software modifications being clearly within the skill of programmers. For instance, the specified computer modules may be replaced by custom designed computer equipment, or commercial equipment such as the IBM personal computer. With regard to the details of the hardware, the manufacturers of the various integrated circuits used and discussed below are identified in Appendix VII.

Figure 2:
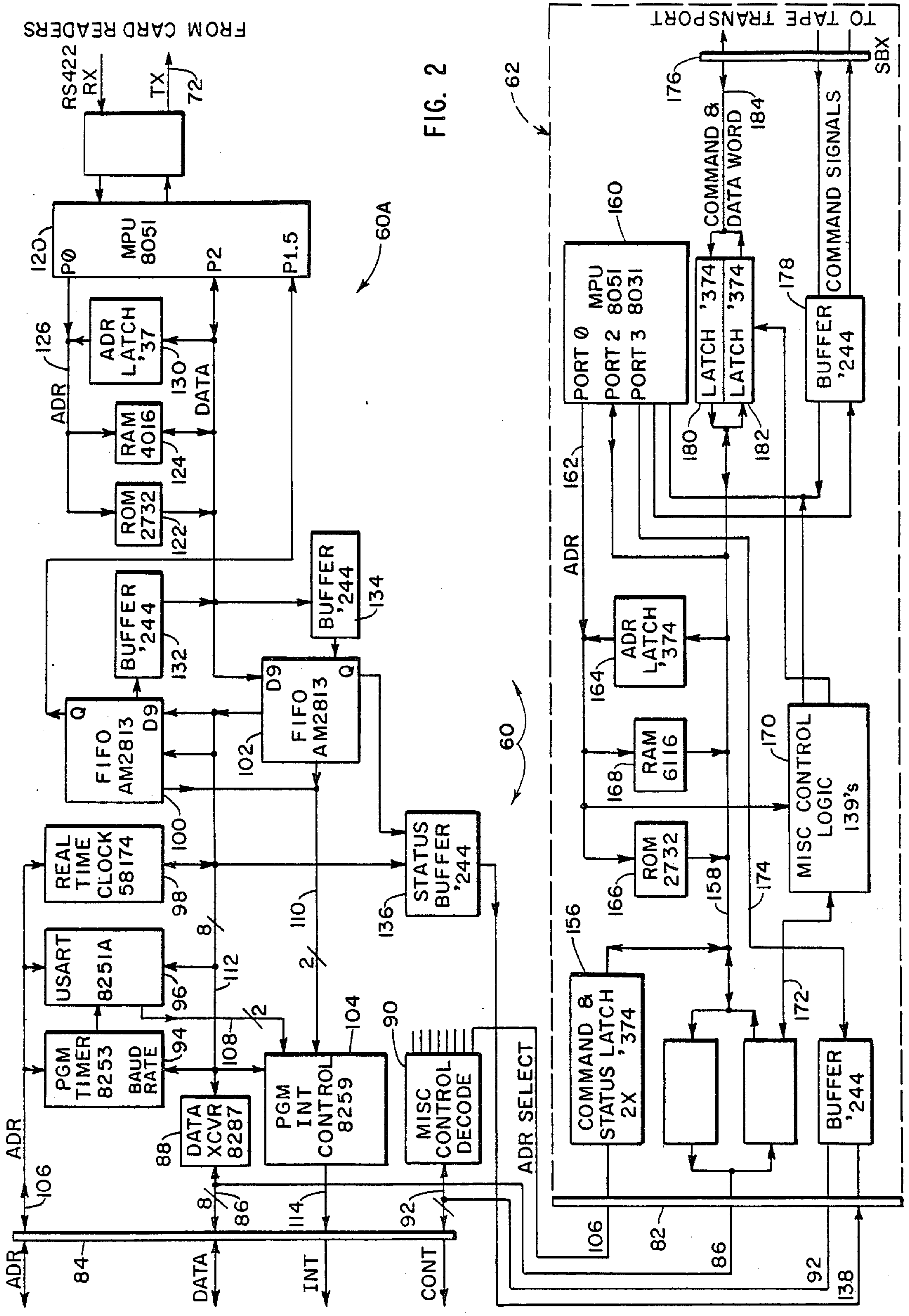
FIG. 2 is a partial schematic diagram of the network communication board (NCB) and tape control board (TCB) of the system shown in FIG. 1.

The NCB 60 is shown in FIG. 2, having a connector 82 which receives the tape control board 62, discussed below. The NCB 60 connects to the iSBC 86/30 computer "Multibus" (trademark of Intel Corporation) connection by connector 84. Information received from the computer 54 includes address, data, and control signals. The Multibus data signals are received on lines 86, comprising 8 parallel data lines, and are received by a bidirectional data transceiver 88, Part. No. 8287. The Multibus control signals are received on leads 92, comprising parallel signals, and are received by the miscellaneous control and decoder function block 90, to provide the specific sequence of signals required by the format of the iSBC 86/30 Multibus system, as well as on board signal processing and conditioning. The data transceiver 88 provides a buffered data bus 112 to the subsequent elements, including a programmable baud rate timer 94, Part No. 8253, and associated universal synchronous/asynchronous receiver/transmitter (USART)96 Part No. 8251A, real time clock 98, Part No. 58174, first-in/first-out (FIFO) registers 100 and 102, Parts No. AM2813, and a programmable interrupt controller 104, Part No. 8259. Similarly, the multiple address signals are provided on leads 106 to the programmable timer 94, the USART 96 and real time clock 98 to provide programmable selection of the connected elements. The programmable interrupt controller (PIC) 104 receives transmit and receive status signals from the USART 96 along leads 108, as well as receiving FIFO full and empty signals from registers 100 and 102 over leads 110. The programmable interrupt controller 104 further receives instruction from the data bus 112 in which to order or prioritize the interrupt signals received on leads 108 and 110 to produce a resulting interrupt signal on lead 114 to the computer 54. The NCB 60 further includes a microprocessor unit (MPU) 120 having an associated ROM 122, RAM 124 comprising Parts Nos. 2732 and 4016 respectively. The microprocessor unit 120 provides address signals from port 0 (PO) along leads 126, wherein additional address locations are indicated by signals received from MPU 120 port 2 (P2) on the data line 128 to address latch 130, typically Part No. 74374. The data bus 128 provides 8 data paths for information flow, and receives instruction for the MPU 120 from ROM 122 and provides data exchange from RAM 124 thereon. Moreover, data is received from the buffer 132, connected to FIFO 100 and provides data to the FIFO 102 through buffer 134. Moreover, as discussed in detail elsewhere, the ninth bit stored in the FIFO buffer is used as a processing flag indicating a particular status to the respective processors involved. In particular, the FIFO 100 receives the ninth bit from the iSBC 86/30 computer along the data bus 112 and transfers that information to the MPU 120 through port 3 (P3). Similarly, the MPU 120 provides the ninth bit to the FIFO 102, which in turn transfers back to the MPU 120 through buffer 136. Command signals are issued from the computer 54 to the tape control board 150 through data transceiver 8287 and a buffer 136 and thereafter through connector 82.

In the tape controller board (TCB) 62, signals from the iSBC 86/30 computer 54 from leads 86, 92 and 106 are transferred to the board 150 through connector 82, as well as signals from buffer 136 along leads 138. The control signals from leads 92 and 138 are received by a buffer 152. The data signals on lead 86 are received from leads 86 by latch 154, typically Part No. 74245. Similarly, the command and status signals on leads 106 are received by the command and status latches 156, typically Part No. 74374. The signals from the latches 154 and 156 are connected to form a data bus 158 received by a microprocessing unit (MPU) 160, typically a Part No. 8051 or 8031. The MPU 160 provides address signals on leads 162 from port 0 (PO) as well as additional address signals from port 2 (P2) through address latch 164. The address signals are received by ROM 166 and RAM 168, typically Parts No. 2732 and 6116 respectively. Moreover, the address signals from leads 62 as well as control signals from buffer 152 on leads 172 are received by miscellaneous control logic element 170, which selects data input and output functions of the TCB circuit. As with the read only memory 122 on NCB 60, the read only memory 166 TCB 150 provides the control program for MPU 160. The MPU 160 also provides control signals to the NCB 60 through buffer 152 along leads 174, as well as providing command signals to the tape transport 66 through buffer 178 connected to connector 176 and respective interconnecting leads. The transfer of byte-wide data to the tape cartridge transport 66 is provided through latches 180 and 182, typically each Part No. 74374, the signal being transferred from the data bus 158 to a data transmission line 184. Previously stored backup data is received by the computer 54 by data flowing from the tape cartridge unit 66 from leads 184, through latch 180, bus 158, and Multibus latch 155, the latches each comprising Part No. 74374.

In the NCB 60, according to the program stored in the read only memory 122, the MPU 120 processes the information received from the computer 54 from the Multibus and data bus 112, received by the FIFO 100 and in turn by the MPU 120 itself from data bus 128, into a serial flow of data over the RS422 data bus 72 to the remote car readers 70 through 70N. The RS422 label indicates a known hardware communications line standard. A similar reverse flow of information is provided, wherein signals received by the MPU 120 from the plurality of remote card readers 70 through 70N on the RS422 data bus 72 is processed into a sequence of parallel words, stored in the FIFO 102 through buffer 134, which is then in turn passed to the computer 54 over the data bus 112 and following Multibus transceiver 88.

Figure 3:
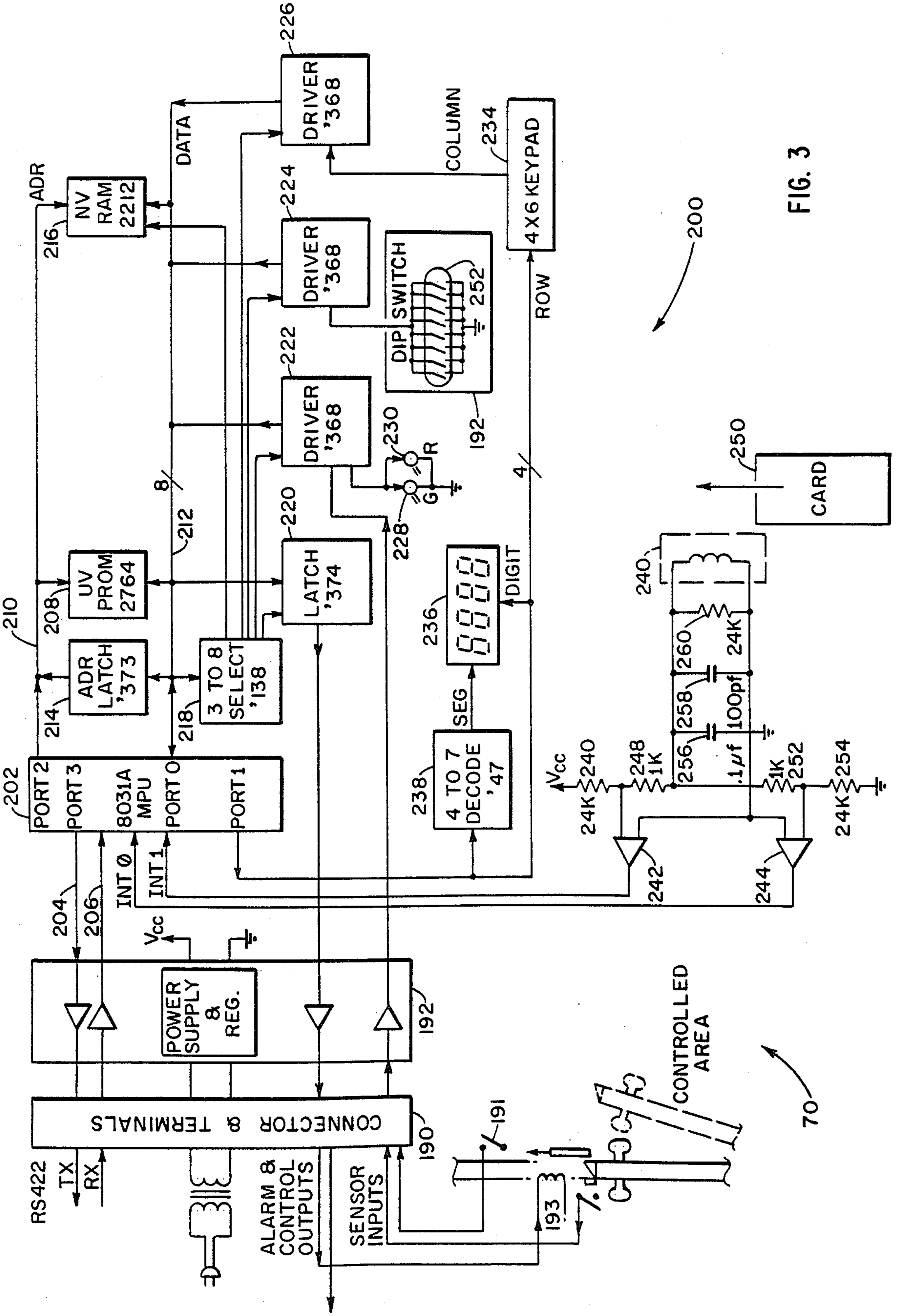
FIG. 3 is a partial schematic diagram of a typical card reader shown in FIG. 1.

According to the present invention, a typical remote card reader 70 is shown in FIG. 3, which includes a connector and terminal board 190, a power supply and line driver board 192, and card reader subsystem 200. Card reader subsystem 200 includes an MPU 202, receiving the signals from the NCB through the terminal assembly 190 and the buffer assembly 192 on leads 204 and 206, respectively. The MPU 202 processes the signal according to a program stored on the ROM 208, typically Part No. 2764. The MPU 202 provides address signals on leads 210, and additional address signals from the data bus 212, captured by the address latch 214, typically Part No. 74373. In addition, transient information is stored in the non-volatile random access memory (NVRAM) 216 typically Part No. 2212, also receiving the address signals on leads 210 and data signals on leads 212. The NVRAM 216 is enabled by a signal provided by the 3 to 8 decoder 218, typically Part No. 74138. The MPU 202 communicates with additional circuits through latch 220, typically Part No. 74374, and drivers 222, 224 and 226, typically each Part No. 74368. The latch 220 provides alarm and control output signals such as a door strike control and duress signal to the external environment, and the driver 222 receives sensor inputs such as a door ajar signal from the external environment through the assemblies 190 and 192, including known connector and driver elements. Moreover, the driver 222 provides signals to indicator light emitting diodes (LEDs) 228 and 230, which operate in response to signals entered by the user and the response by the system, discussed below. An eight pole switch 232, retained on board 192 is read by driver 224, for functions described below. External card user signals are received by the system MPU 202 through the driver 226 from a keypad 234 wherein a sequence of four signals is provided from the MPU 202 port 1, the corresponding orthogonal sense lines being received by the driver 226 and read therein upon select signal provided by select decoder 218 according to techniques known in the art. Similarly, the drivers 222 and 224, as well as latch 220 are enabled by select signals provided by the decoder 218 according to signals generated by the MPU 202 and received over the address bus 212. In addition, a four digit seven segment display 236 is provided wherein the segments are driven by a four to seven segment decoder 238 being driven from the MPU 202 port 1 (P1); similarly, the digits are selected by the remaining four bits of the P1 signals.

The card reader subsystem 200 further includes a card reader coil 240 producing a pulse signal upon presentation of the card 250 as taught by the manufacturer, Sensor Engineering of Hamden, Conn. The pulse signal produced by the coil 240 is received by a pair of comparators 242 and 244 to detect negative and positive transitions thereof. The transitions are determined by reference to a voltage divider comprising resistors 246, 248, 252 and 254 as shown in FIG. 3 to provide a modest dead zone in which no comparator output is produced. The voltage divider at midpoint is bypassed to ground by a capacitor 256. Similarly a shunt capacitance 258 and resistance 260 is provided across coil 240 to provide the desired damped pulse response. The signals from the comparators 242 and 244 are received by MPU 202, which cause the MPU 202 to decode the card 250 code.

The central console system computer 54 selects the particular card reader 70 by address code signals sent through the NCB and data bus 72 to the card readers 70 through 70N. The resulting decoded card code and keypad information is then returned to the NCB. The console computer 54 responds to the particular request and associated identification codes and either permits or denies entry to the door associated with the card reader 70. Information from the computer 54 will also be presented on the card reader display 236.

Software

Figure 4:
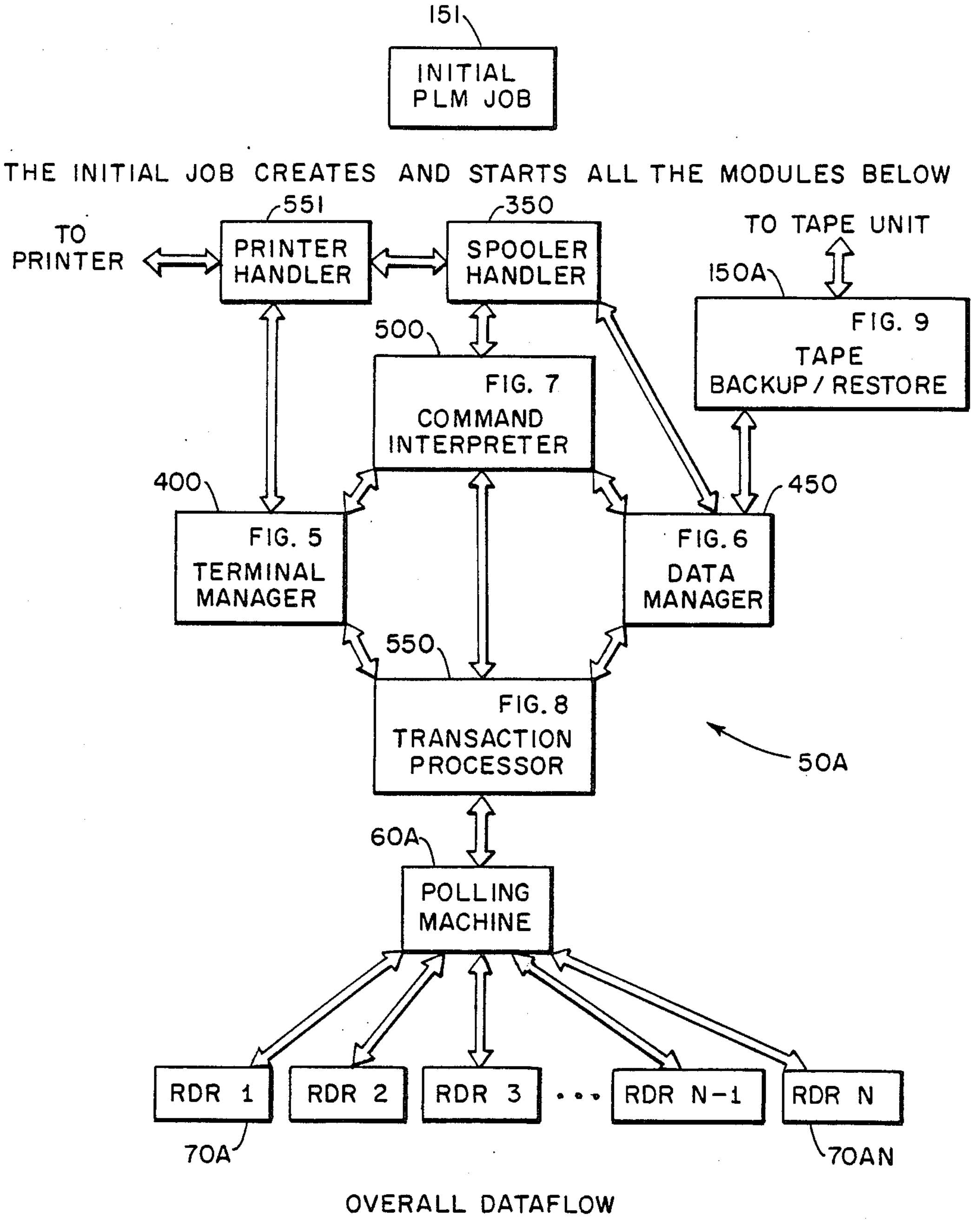
FIG. 4 is a block diagram of the overall dataflow for the system according to one embodiment of the present invention.

The overall dataflow 50A for the system according to the present invention is shown in FIG. 4. The system of the present invention has hardware which corresponds to the system 50 shown in FIG. 1, wherein a plurality of card readers 70 through 70N containing operation subsystems 70A through 70AN, and reports to a polling machine 60A residing in NCB 60, which processes the card reader 70 through 70N information for retransmittal to a console 52 having a printer 64 and backup tape cartridge unit 66. The console 52 operates according to the system modules contained therein in a computer system 54 as discussed above. The system 50 major blocks contained within the console 52 include a transaction processor 550 discussed in FIG. 8, a data manager 450 discussed in FIG. 6, and a command interpreter 500 discussed in FIG. 7. A terminal manager 400 is discussed in FIG. 8, and a tape backup and restore module 150A (residing in the MPU 160 in the TCU 150), is also included in the system dataflow, FIG. 9.

According to the security system of the present invention, the card records, reader records, group definitions (schedules), temporary pass records, console passcodes, and holidays form a database, defined below. The individual records and definitions are entered at the system terminal. The optional tape backup is provided to save or restore the database contents on operator command. The system will restart automatically after power failure if the memory data has not been damaged. The system also provides an operator "load" command, which allows the initial database to be prepared away from the site of an installation and transferred to system memory by a temporarily connected tape unit.

Figure 9:
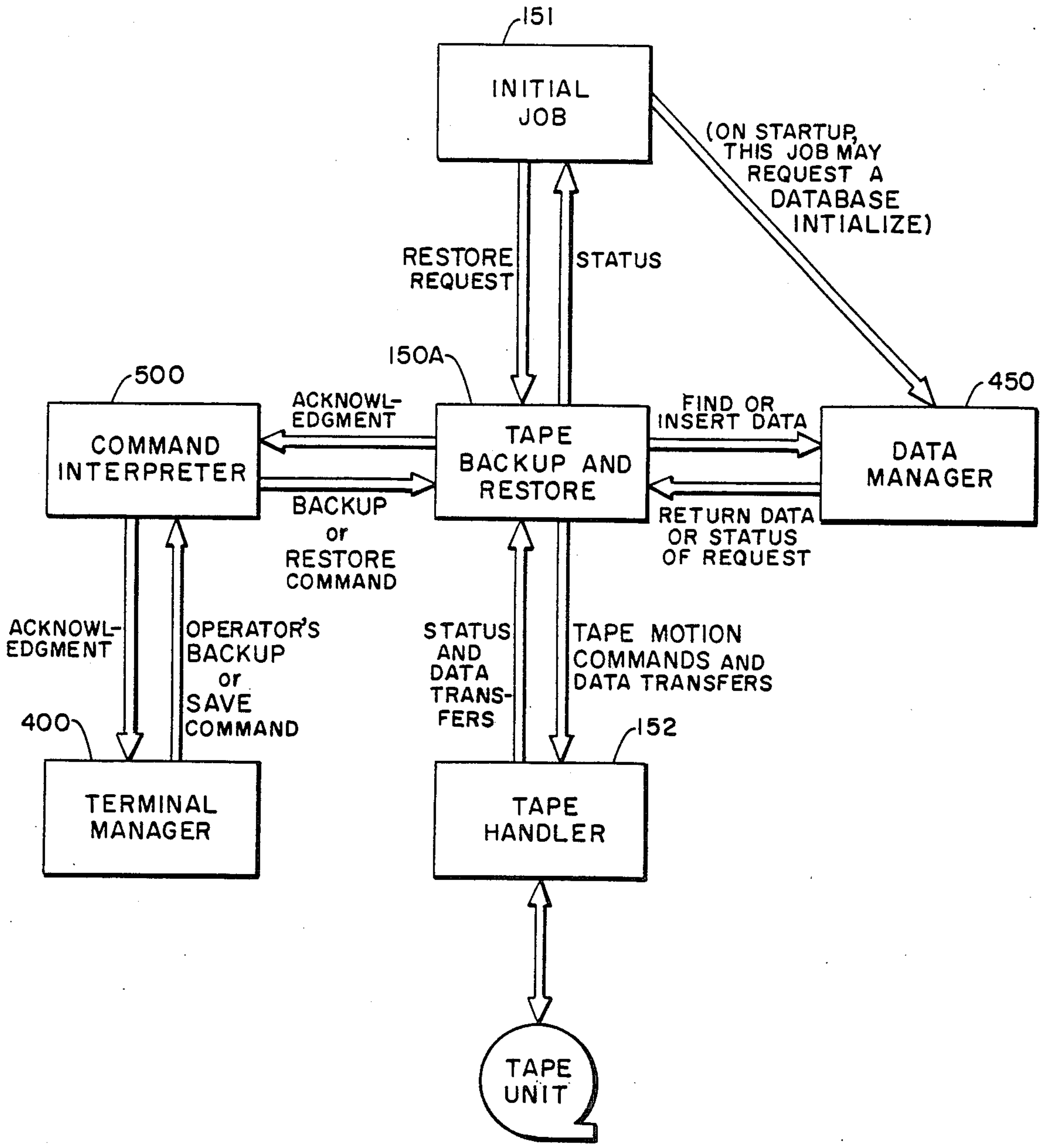
FIG. 9 is a diagram showing the exchange of data for the tape backup and restore module shown in FIG. 4.

Tape restore, discussed with respect to FIG. 9, is not performed automatically on power up, since the data in the RAM is retained for 48 hours. The operator is prompted if a restore should be done.

Since the system cannot validate transactions on an empty database, the database must contain at least one reader record, one group definition, one password record and one card record. Furnished with this much data, the system is capable of processing access requests from the one defined card. Until at least one card record exists in its database, the system will deny all card-based access requests on the grounds that it cannot find a record of the card used.

If any temporary passes are defined, the system will accept keycode-based access requests. The use of this temporary-pass mechanism is entirely optional; conceivably, some installations will never use it.

A card record is the basic reference unit for validating all cardholder transactions. The system accepts card numbers in the range 0–32,767 and stores up to 4000 randomly numbered records. Card records are created, revised, displayed, and cancelled at the system terminal. Each record contains the following items:

Cardcode number
Cardlabel number
Keycode number
Group Assignments Set
Use Limit Number
Use Count Number
Card Monitor Switch
Last Reader Used Number.

The cardcode is the number invisibly encoded into the card; the system uses this as a basic key during validation of access requests. It may have any value from 00000 to 32,767. This value is entered by the operator at the time a card is issued. Entry into this field is "required" and has no default value.

The cardlabel is the number visible on the card. For reasons of security, there is no fixed relationship between the cardlabel and the cardcode. All displayed or logged references to a card use the cardlabel. The user organization must keep external records associating employees with cardlabels. The label may have any value from 00000 to 32,767. Entry into this area is required and has no default value.

The keycode is a four-digit number that must be used by the cardholder for all "card and keycode" accesses, and may have any value from 0001 to 9999. It is not necessarily unique for each cardholder, but in most cases will be.

Keycodes are assigned by the operator and may be chosen by the user. However, the system will check the data bases and prevent the assignment of a card keycode with the same value as an existing temporary pass keycode.

The Group Assignments Set identifies all of the groups that govern access requests for the card. The system uses these to validate all access requests for the card, based on the reader and current time of the request.

The Use Limit is a value from 0 to 99 which specifies the maximum daily uses permitted the card at designated readers (see Readers below). If the value is 0 (the default) the system enforces no limit. This limit may be set by the operator when the card is issued or at any time thereafter. This field is not required, and defaults to a value of "no limit."

The Use Count counts the actual uses: only valid accesses apply against the specified limit. It is reset at the beginning of each day. The operator cannot write into this field; only the system writes into it. The operator may reset this field to zero on one or all cards.

The Card Monitor Switch is either OFF, or ON (access), or ON (no access). Normally it is off; when it has either of the two ON values (by operator command), every use of the card is announced at the system terminal as an alarm message. This field is not required; the default value is OFF.

The Last Reader Accessed field records the number of the last reader at which the system granted a valid access to this card. The system uses this value, together with certain reader attributes (see section four of this chapter), to perform antipassback testing. Normally, this field cannot be set by the system operator, though it may be displayed. There is, however, a reset command for special situations.

Exactly one reader record must exist in the database for each installed physical reader unit in a given installation. A reader, as stored in the system database, has the following attributes:

Address
Keycode-Required Switch
Use-Limit Applied Switch
Antipassback Test Switch
Precedeset.

The reader Address is physically set at the reader unit; it is not programmable from the console. At initialization, the system itself determines the physical addresses of all the readers currently responding, and warns if any of the database reader records does not have a corresponding physical reader.

The Keycode-Required Switch is either ON and OFF. When the switch is ON, the system will require a keycode with every card-based access request. This access mode is programmable by the operator.

The Antipassback Test Switch is either ON or OFF. If is programmable by the operator. If this value is ON, the system performs antipassback testing on each access request at this reader.

Precedeset identifies only those readers that may immediately precede access to this reader, as determined by their physical location. Since the system uses this set, together with the Last Reader Accessed field in the card records, to perform antipassback testing, the set must be defined for any reader whose Antipassback Test Switch is ON. It is programmable from the terminal, but is normally not revised except after changes in reader location or building configuration (i.e. remodeling).

A Group is a schedule and a set of readers. The system holds up to 32 group definitions, entered at the system terminal. A group is defined by simply listing the readers in its set, and defining the schedule associated with the group. Each group has an identifying number from 1 to 32. Once defined, a group may in turn be associated (by means of its identification number) with one or more cardholders, to govern the times and readers at which the cardholders will be granted access to secured areas. Within a group, all reader accesses are governed identically by the group schedule.

The group schedule consists of 10 "micro-schedules." Each micro-schedule defines a single time period (by its start and end times), and assigns this period to any combination of eight days (the seven days of the week plus a generic "holiday").

Temporary passes may be created, displayed, and cancelled at the system terminal; only the group assignment set, identification number, and expiration date may be revised.

A temporary pass consists of the following items: (1) Keycode number, (2) Group Assignments set with optional ID number, and (3) Expiration Date.

The Keycode is an arbitrary value from 0001 to 9999, excluding any value that is in use as a card keycode. It is supplied by the operator and may be specified by the user.

The Group Assignments set is identical in format and purpose to the group assignments set defined above for card records. The optional ID may be used, at the discretion of the user organization, to tag the temporary pass keycode with a five-digit identifying number (less than 32,767). If the field is present, the system will include it in all reports that reference the pass. The ID has no internal significance to the system.

The Expiration Date is the last date on which the temporary pass will be honored by the system. Technically, it expires at the end of that day; the effective expiration time will be governed by its group assignments. A default value to the expiration date is the current date.

Figure 8:
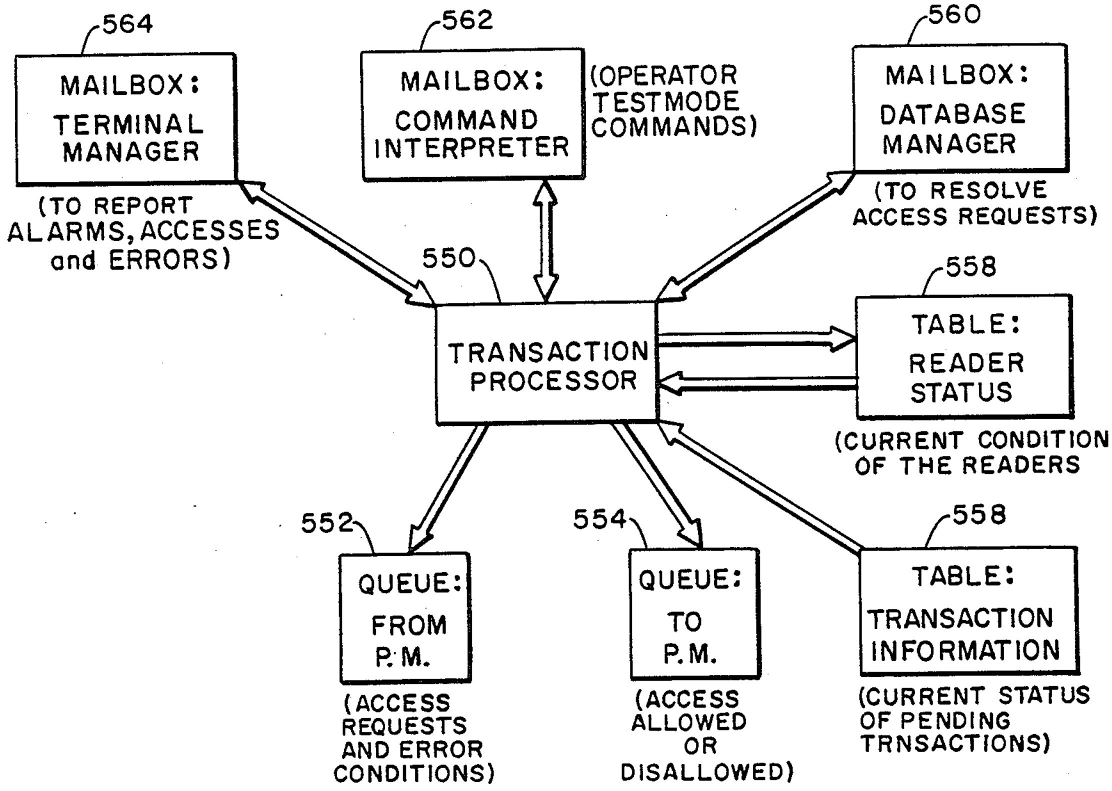
FIG. 8 is a diagram showing the exchange of data for the transaction processor shown in FIG. 4.

The transaction processor 550 of FIG. 8 monitors all installed readers for incoming access requests. A request begins when someone either (a) presses a sequence of digit keys, or (b) runs a card through the slot. The system concludes every transaction by either (a) unlocking the door at the reader involved, (b) leaving the door locked and displaying an alarm message at the system terminal, or (c) aborting the transaction, e.g., if the person abondons his request.

At some readers, the system may require only a card; at others, it may also require an auxiliary keycode. In general, keycodes (without a card) provide only a low level of security, and are therefore defined only as temporary passes rather than as reader attributes. The system logs all normal transactions on the printer, if one is present, through the terminal manager 400 of FIG. 5. Information is transferred between the system console and the polling machine by a serial data connection 72 defined in FIGS. 2, 3, and 10.

There are two types of alarms: hardware-related and access-related. Hardware alarms originate in such conditions as tampers, communication problems, door left open ("door ajar"), and so on. Access-related alarms originate with anomalous access requests, i.e., at the wrong time, at the wrong reader, unrecognized keycode, and so on.

The "point of detection" for various alarms may be almost anywhere within the transaction-handling mechanisms. Some hardware-related alarms, such as a card reader tamper alarm for example, are detected at the reader units. Others, such as communication problems, are detected by the polling-machine program that drives the communication board.

Of the access-related alarms, most are detected by system software when it compares the access-request information with the relevant contents of the operating database. A few are detacted at the reader; in particular, when access depends on entry of a correct keycode in addition to a valid card, it is the reader unit that compares the required keycode sequence (sent down from the system console) with the one actually entered.

Regardless of the point of detection, all alarm reports are displayed at the operator's option at the system terminal to be announced to, and acknowledged by, the system operator.

Each card in the system may be individually use-limited. A software switch on each reader determines the applicability of the use limit to that reader. The specified use limit for each card applies only at readers whose use limit switch in ON. The limit is cumulative for all such readers; it does not distinguish one reader from another.

Any secured area may be subject to antipassback checking. All such testing is performed entirely by software, and is completely programmable from the console. Areas may be nested, changed, and reconfigured at will, subject only to the following constraints: (a) every access path into and out of the area must be under system control; and (b) temporary passes (i.e. keycode-only accesses) are not allowed into the area.

The actual test uses the Last Reader Accessed field in card records, and the Precedeset and Antipass Switch fields in each reader record. The algorithm used is perfectly general, and does not require readers to be explicitly designated as IN or OUT.

The operating subsystem reader unit 70A through 70AN consists of two input devices having a slot to receive a card and a numeric keypad to enter keycodes. The reader unit 70 through 70N has three visual feedback devices: a red LED, a green LED, and a numeric LED display (228, 230, and 236 of FIG. 3, respectively). Anyone may request access to a secured area by approaching a reader unit and either running a card through the card slot, or entering a keycode on the numeric keypad. The first of these are called "card-based requests," and the second is "code-based requests." Each of them is discussed separately below. Regardless of the request type, however, the person who has requested access will see, within two seconds, either the red LED, indicating his request is denied, or the green LED, indicating his request is accepted and the door is unlocked, or a prompt indicating that he is to enter a four-digit keycode for further validation of his request.

In the latter case, if he enters the correct keycode, the reader will give him a green LED and unlock the door. If he enters an incorrect keycode, the reader will show him the red LED, and allow him additional tries, according to a count that is programmable from the console. If he has not entered a correct keycode at the end of the attempt countdown, the system announces an alarm and aborts the entire access request. Whenever the reader in not looking for or accepting a keycode, its numeric LED display shows the current time.

When a card is presented, the following conditions must be fulfilled before the system will grant an access to the respective areas controlled in order from the simplest to the most complex.

A card presented from another system (not shown) will be unconditionally rejected. If communications between the reader and the system console 54 were interrupted, the reader unit can be configured to pass the card on the basis of its system code alone, since none of the more complex tests below can be performed. Whether an individual reader in "degraded" mode will pass or reject a card with the correct system code is programmable by the operator. If the card used passes the "system-card" test, the system database will be interrogated for a record of this card. If none exists, the system will deny the access request and announce an alarm. Even if the system has a record of this card, there are two cases in which it may nonetheless create an alarm and/or end the transaction.

The database record of each card contains a three-value field whose values are not alarm, alarm/access, and alarm/no access.

If this flag is set to alarm/access, the system will announce an alarm but continue normal processing of the request; but if it is set to alarm/no access (which will happen if it has been reported to the system operator as a "lost card"), there is no reason to perform any further tests; the system denies the access request and announces an alarm.

So far the system 50 has established that the card belongs to this installation and has been validly issued. Next, it tests whether access of the current reader is permitted at the current time. It does this by testing, in turn, each of the groups (as many as 32) to which the card presented is assigned. If the current reader, and the current time, are found in any one of these group definitions, then the group assignment test is passed.

Each group to which the card is assigned has a list of readers which may be used. If the reader used is on this list, the system continues on to the next test; otherwise it announces an alarm and denies the access request.

Each assigned group also has schedule times during which access may be validly requested. The system attempts to find a slot, among those comprising the schedule, that includes the current time. If it fails, it sends an alarm to the terminal and denies the access request; otherwise it passes on to the next test.

In the card record is a number that specifies the maximum accesses allowed each day. In the record of each reader, there is a flag that identifies the reader as a use-limited reader. If the current reader is a use-limited reader, the system counts the access request against the limit in the card record, and if this count exceeds the number stored in the card record, denies further access requests for the rest of the day, and sends an alarm to the terminal each time the card is presented.

The reader to which the card is presented may have been designated, in the system database, as an "antipassback" reader. If it is, then the system will check whether it was physically possible for the user to get to this reader from the last reader used. If it was impossible, then the system deduces that the card was "passed back" to another user, sends an alarm to the terminal, and denies the access request.

The system checks into its records for the reader used, to find whether it must also request a keycode, or whether the card alone is sufficient to gain access. Note that this question is answered on a reader-by-reader basis. If the access method is "card-only", then the system commands the reader to unlock the door. The reader signals this with a green light, and the user enters. (The system waits a certain amount of time for an indication from the reader that the door in fact was opened; if no indication exists, it assumes that the user intends to abort, and aborts the entire transaction and announces an alarm.)

If the system finds that the designated access mode for this reader is "card plus keycode," then it looks into the card record for a four-digit keycode, and sends it down to the reader with instructions to wait for a keycode from the user, compares it with the one it has just received, and grants or denies access based on the results of the comparison. If the keycode entered matches the one stored in the card record, the reader unlocks the door and waits for the user to pass through. If the keycode entered does not match, the reader allows a (programmable) number of additional tries before sending an alarm up to the console; the door remains locked.

All transactions that begin with a keycode are handled by the system 50 by a "temporary pass" mechanism. The system first checks the current reader entry in the reader table to see if it is an "antipassback" reader. If it is, no temporary pass transactions are allowed, and the system sends an alarm to the terminal and denies the access request. When a four-digit keycode is entered, the system attempts to locate a number corresponding to this keycode in its table of temporary passes. If it does not find such a number, the request is denied immediately, and sends an alarm to the terminal. If the system finds a keycode, it may have associated with it a set of group assignments. In this case, the system will perform the usual reader/time validation sequence.

The keycode record may have associated with it both a set of group assignments and an individual identification number, representing perhaps a guest, visitor, or temporary employee. The system handles this as in the preceding paragraph, but includes the identification number in the report.

In special situations, the system operator may issue a command at any time that has the effect of unlocking a reader-controlled door for an amount of time that is also programmable. Moreover, some doors may have a pushbutton 191, FIG. 3, mounted on the opposite side from the side that is governed by a reader unit. The pushbutton unlocks the door with strike 193, and the reader 70 signals the console 52 when this happens.

Whenever the reader prompts for a keycode, the cardholder may precede his keycode with a special digit to indicate duress.

The system, especially the operator interface, is designed in such a way as to make large classes of operator errors impossible. It is impossible, within the present system, to reference groups, cards, schedules, readers, etc., which do not exist; it is impossible to enter syntactically inappropriate data values; it is impossible to place the screen cursor at an undefined location; and all keystrokes that do not have a defined role, for any given state of the system, are ignored.

A cardholder requesting access at a reacer whose designated access mode is "card plus keycode" may enter a programmable number of erroneous codes in a row before the system reports an alarm. A "clear" key is available to him to allow escape from an erroneous digit entry. On any transaction, the cardholder may change his mind even after the system has given him a green light; the system will time out waiting for a signal that the door has actually opened, and abort the transaction. The control program is capable of detecting a number of nonfatal errors, especially in communication between modules 70 through 70N and NCB 60.

A console operator with the proper level of access can place one reader in "testmode." This allows the console operator to diagnose problems with a reader and to issue specific polling machine level commands directly to the reader and to see the results, in Octal code, reflected back on the system console.

Clock Interface

The clock interface is responsible for all time-keeping functions of the present system.

The clock interface actually consists of two separate clocks. The first clock is a hardware clock 98, a National Semiconductor MM58174 CMOS clock chip, located on the network control board (NCB) 60 of FIG. 3. The second clock is a software clock, an interrupt routine driven by a 1-Hz output of the power supply. Both interact to give the correct time even in the event of a power outage.

The MM58174 clock chip 98 is even-addressed (I/O locations) from 20OH through 21EH. These ports correspond to the following chip resisters:

200: test (write only)
202: tenths of seconds (read only)
204: units of seconds (read only)
206: tens of seconds (read only)
208: units of minutes
20A: tens of minutes
20C: units of hours
20E: tens of hours
210: units of days
212: tens of days
214: days of week (1–7)
216: units of months
218: tens of months
21A: year/leap year (write only)
21C: start/stop (write only)
21E: interrupt/status.

During normal operation, the test register (200H) should be set to 0, and the start/stop register should be set to 1 (running). Note that several registers are either read only or write only. The seconds registers are read only, and are reset whenever the clock is stopped. Since the clock must be stopped to set the day or date, the seconds are reset whenever the day or date is set. The year/leap year register is a write only register, whose contents indicates the occurrence of a leap year.

The interrupt-driven software clock is driven by the 1-Hz signal from the power supply, and tied to the interrupt level 7 of the NCB 60 slave 8259A 104 programmer interrupt controller chip (PIC). Every second, the interrupt updates the following software registers: second, minute, and hour. Once a day, at 30 minutes, 0 seconds past midnight, the software timer updates the CMOS clock chip. Therefore, the clock chip is not allowed to drift over more than one day, resulting in a maximum time error on the order of several seconds.

There are four main software entry points to the clock interface: set time, get time, set date, and get date. All of these entry points consist of parameterized function calls.

The 1-Hz clock interrupt is tied to interrupt input 3 of the slave PIC 104 on the NCB. The associated interrupt handler consists of several nested do loops which increment the second, minute, and/or hour memory locations. At 30 minutes, 0 seconds past midnight, these memory locations are used to update the registers in the CMOS clock chip. Finally, the handler executes an "rq$exit$interrupt" system call.

Terminal Interface

Figure 5:
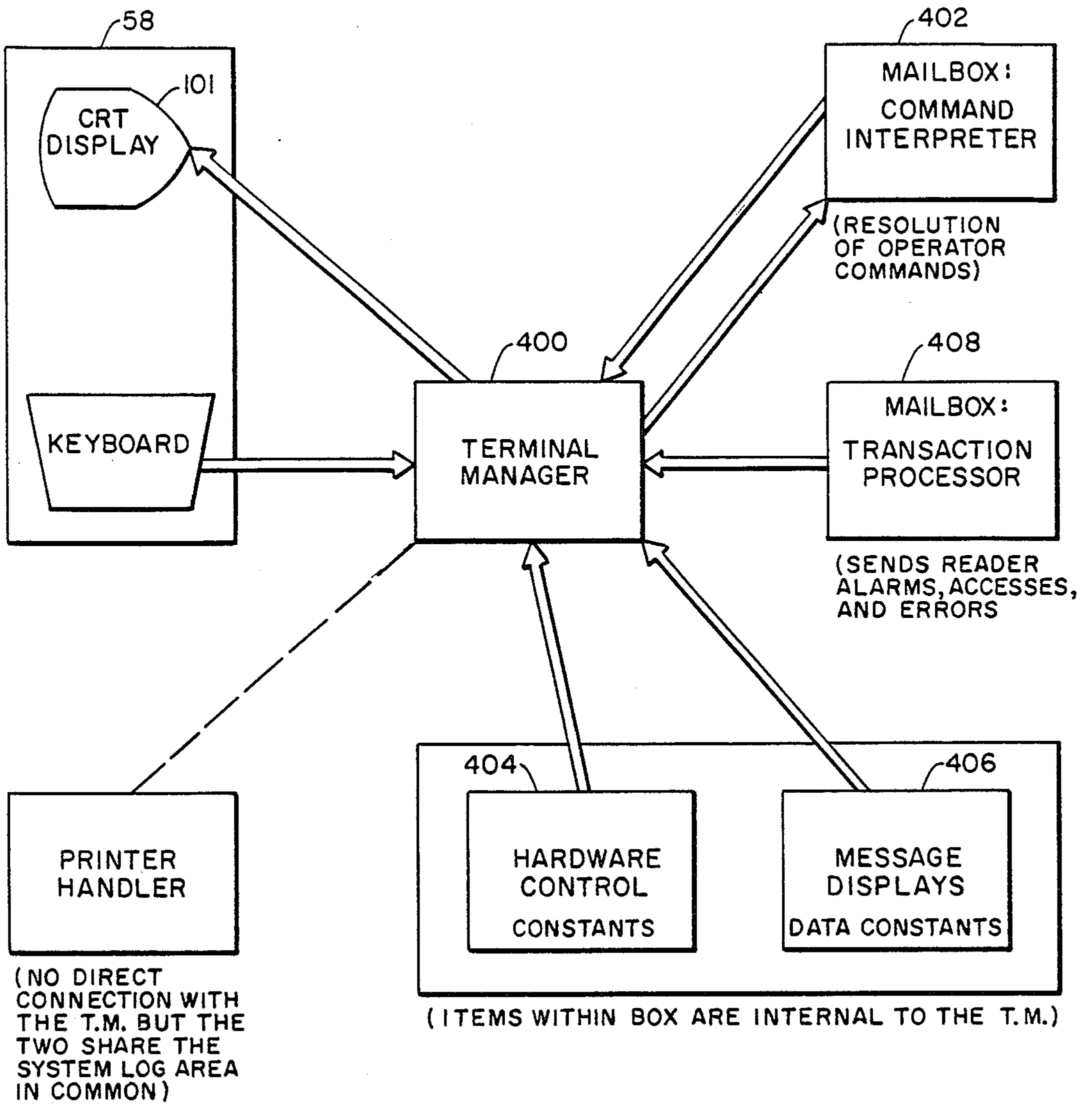
FIG. 5 is a diagram showing the exchange of data for the terminal manager shown in FIG. 4.

Terminal interface software of FIG. 5 transfers data between the system terminal manager (TM)400 and the system console terminal 58. If buffers data in both directions; up to 255 characters from the keyboard, and up to 1023 characters out to the display. Because data input is interrupt-driven, type-ahead can be (and is) utilized by the TM.

The terminal driver interfaces to the system and the TM through an initialization task and three called routines: SER$IN$Q$MT, SER$IN and SER$OUT. The initialization task sets up the console terminal communication parameters, and initializes the various queue pointers and the interrupt handlers. That accomplished, it permanently suspends itself.

SER$IN$Q$MT is a status routine, called by the TM 400, that indicates whether or not any characters have been entered from the keyboard but have not yet been read from the input queue. If the queue is empty (no characters waiting), it returns a logical true (FFH). If the queue is not empty, it returns a logical false (O). This routine determines queue status by comparing the head pointer (ser$in$hptr) with the tail pointer (ser$in$tptr). If the two are equal, the queue is assumed empty.

SER$IN is the routine called to return one character from the input queue. When called, it first in turn calls SER$IN$Q$MT to determine whether a character exists to return. It will continue calling SER$IN$Q$MT until a character exists. Then it takes the next available character (indexed by ser$in$hptr), increments ser$in$hptr, and returns that character.

SER$OUT is the routine called to output a character to the terminal. When called, it places the character in the next position (at the tail pointer, ser$out$tptr) of the output queue. It then checks whether the serial output interrupt handler has disabled itself. If it has (ser$out$disable$flag is true), ser$out outputs the byte itself, and reenables the serial output interrupt handler.

The system serial interrupt interface consists of two interrupt handlers: INT$SER$IN, which is responsible for getting characters from the keyboard; and INT$SER$OUT, which is responsible for putting characters out to the console CRT.

INT$SER$IN grabs the data byte out of the UART data port, and places it into the next position of the serial input queue; i.e., at ser$in$queue(ser$in$tptr). It then increments the tail pointer, and exits the interrupt.

INT$SER$OUT first checks the serial output queue to determine whether a byte actually exists to output. The queue is empty (no bytes exist) if the head and tail pointers are equal of (if ser$out$hptr=ser$out$tptr). If the queue is empty, the serial output interrupt level is disabled, and the flag ser$out$disable$flag is set to true. If the queue is not empty, the next character (ser$out$queue(ser$out$hptr)) is output to the USART data port, and ser$out$hptr is incremented MOD 1024. Finally, the handler calls the rq$exit$interrupt system call.

Terminal Manager Description

The function of the Terminal Manager (TM) 400 of FIG. 5 is to handle all operator interaction. With the use of the terminal 58, the operator can make database alterations, display and acknowledge alarms, print database listings, and make all other necessary, operator accessible, system changes.

The system operator enters commands via the system terminal 58, and the system displays its responses to these commands on the terminal display. Operator access to the terminal is governed by a log-in sequence, which requires him to enter a unique five-digit password. At system powerup the terminal is locked; the log-in sequence unlocks it, and the operator may lock it again by explicit command.

When an operator has logged in, the system displays a menu of the commands he may issue. Each password is associated with exactly one of three console access levels, and it is these access levels which determine the list of commands that will be displayed for the operator.

One additional access level may be accessed by qualified maintenance personnel for purposes of testing, diagnosis, and repair. This level is described below.

Since the present system operator has the responsibilities for maintaining the system database and responding to alarm reports, the system provides two different display forms (i.e. "screens") to assist him. One screen provides for selection of commands; it is organized as a master menu with submenus. The other provides a convenient method of reviewing recently acknowledged alarms and operator commands.

The display screen is divided into four separate functional sections. First section is the time and date fields, which are displayed at the top of the screen. The time is updated every second and the date is updated every fifteen minutes.

Two lines below the time and date, the second section is located. This is the command and information section. These lines are used to display operator-selected commands and give needed information and error messages to the operator.

The main body of the screen is the work area and will display command menus and all necessary record forms. The command menus will display to the operator only those commands allowed to his/her access level. Each system command has a priority level from 1 to 3.

Each database has its own record form that it uses to display the record to the operator. The following are the different types of records in the present system: Reader, Group, Card, Temporary Keycode, Operator Passcode, and Holiday Calendar. One other type of record uses the work area; this is the System Log. The System Log is a record of the last 250 transactions in the system. A transaction is either an alarm or executed operator command. Upon completion of a transaction, the Log is updated.

The last section of the display screen is the alarm area. Whenever information from other system modules needs to be displayed, the specific module sends an "alarm" to the TM. These alarms are placed in a queue and the oldest highest priority alarm is displayed at the top of the alarm area. At any time the operator can acknowledge this displayed alarm by hitting the "acknowledge" key. The acknowledged alarm is displayed at the bottom of the alarm area and next, oldest priority alarm is displayed at the top.

Figure 7:
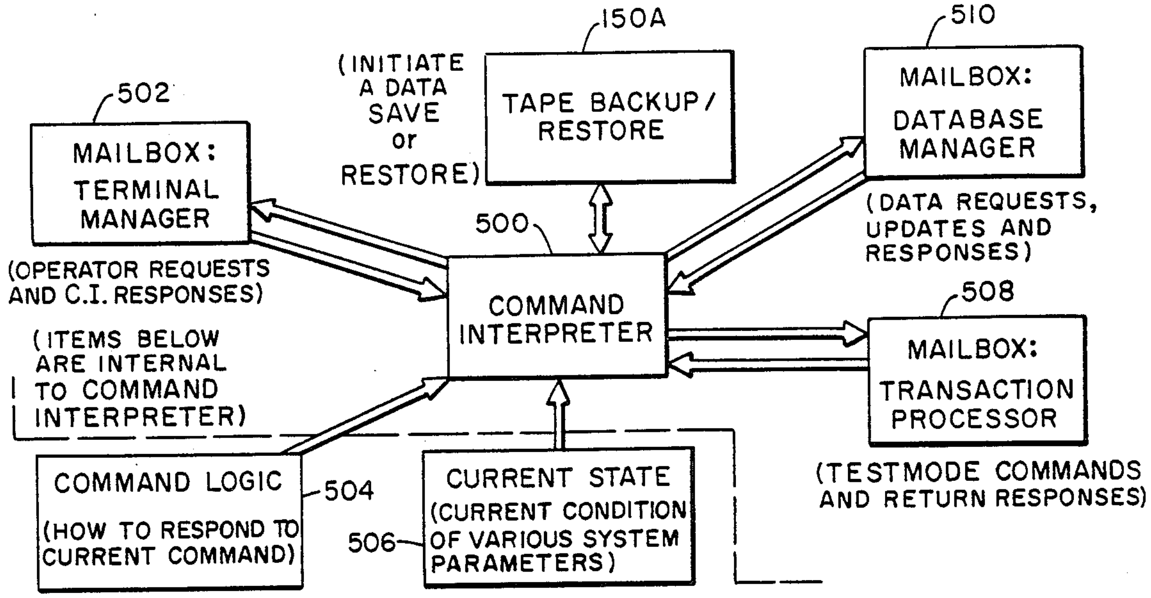
FIG. 7 is a diagram showing the exchange of data for the command interpreter shown in FIG. 4.

The operation of the terminal manager 400, excluding alarm handling, governs conversations between the system operator and the terminal manager, and between the terminal manager and the command interpreter (CI) 500 of FIG. 7. To start operation, the CI sends a message through mailbox 402 to display a log-in screen and request an operator passcode. The operator must supply a passcode at this time using the system keyboard. When the passcode is entered, the TM sends a message including the passcode to the CI. The CI must check the validity of the passcode and return a success/failure message to the TM. These conversations continue throughout the life of the system.

When the TM receives an "operator log-in success" message from the CI, the TM informs the operator that he has entered the system and the priority level at which he entered. Again, the TM waits for a message from the CI; this time the message is to display a menu and get a command from the operator. The operator can select a command by either a letter representation of the command or by cursor manipulation with a select key.

Upon selection of a menu command, the command is echoed on the command line. At this point an operator supplied parameter may be necessary. A prompt line is written out in the command line and the cursor is placed at the prompt area for the input. All operator input at the keyboard is either numeric or a single alpha keystroke. When alpha string variables are necessary, as in the case of "yes" and "no" for a parameter, then a toggle key is supplied (e.g., to select "yes," only the "y" key need be entered).

If the operator selects the "add card" command, then a prompt is issued for the card label. When the operator supplies the label, the requested command with parameter is sent to the CI through mailbox 402. If the CI detects no problems (such as card label already in use), it sends a message to display a card record form and get card fields. The TM then erases the current menu, displays a card record, fills in the label field, and places the cursor at the first empty card field.

Now the CI waits for operator-supplied parameters. The operator supplies the card information by moving the cursor and entering the appropriate data. To exit the record and return to the menu, the operator must either enter the quit key or the execution key, aborting the add card command or placing the card record in the database, respectively. The TM then sends a message to the CI to inform the CI of the action requested by the operator.

The printer handler 551 has only two minor interactions with the TM 400. The first is that they have a common data structure, the system log. The printer handler keeps its own index into the system log and prints out the contents whenever it gets the time.

The other interaction is an alarm. When the printer unit is inoperative, an alarm message is sent from the printer handler to the TM to be displayed as a standard incoming alarm.

Finally, the TM has no direct interaction with the printer handler for printing database jobs. The TM sends all print requests to the CI. For further information, see the CI description. Hardware control constants and message display data constants are provided in blocks 404 and 406, part of TM 400.

The system time updates display screen every second for dynamic system status. A system passcode is supplied whenever the passcode database is empty.

There are three separate alarm priorities. Any priority may be shut out of the system log and/or the printer. A reader testmode menu is supplied. This menu allows operator to test and exercise any reader in the system. For more information, refer to the CI description. Printer queue overflow is protected. Whenever the system log becomes 80 percent full of unprinted records, the TM automatically starts saving only high priority alarms. Whenever the alarm queue becomes full, the TM auto-acknowledges the oldest alarm and flags them at the printer and in the system log. A group record cannot be deleted if it is still in use by any card or temporary keycode record. A reader record cannot be deleted if it is still in use by any Group record.

Certain keys are dedicated to control the display. They are used for selecting commands, entering data, and acknowledging alarms. The screen cursor moves left, right, up, and down under the control of four arrow keys. The cursor does not move freely to any position in the display; it moves only among menu items and data fields. To select a menu item, the operator presses a single alpha key. No further actions (e.g., a carrier return keystroke) are needed. The selector character for each menu item is displayed immediately to the left of the item. No specially designated key is necessary to terminate a field. In multiple-field records such as "card", any arrow key terminates the current entry and moves the cursor to either the following or preceding field. During single-field entry sequences (such as most command-line parameters), any arrow key terminates entry and returns the cursor (nondestructively) to the start of the current field.

During the entry sequence for any multi-character field, the operator may backspace/delete characters, one at a time, back to the beginning of the field. Two keys will perform this role (delete and backspace); they are recognized only during data entry and are ignored at all other times.

All commands that accept multiple-field data entry are effectively "modal," i.e., they require an explicit terminating keystroke. If the operator finds, after entering all fields, that there is an error in a previously entered field, he may move the cursor to that field and re-enter the correct data. Any valid keystroke will delete the data already present, and initiate a new entry sequence for that field.

The command "execute" is the explicit terminating keystroke referred to above. This key may be pressed at any point during a command; it terminates the entry/revision sequence, initiates semantic checking of the final data values if that is appropriate, and stores the final values of any data entered. If the executed command takes command line parameters, the cursor returns to the first parameter field to prompt for a new value. At this point, the operator may either enter another value(s), or press the quit key (see below) to return to the menu from which the command was invoked.

One key is assigned a "quit" function. Its role is identical at all times: it moves the terminal display up one node in the menu/command tree. Any command in process is aborted; if a lower-level menu was on the screen, it is replaced by the next higher menu. If the current screen is the displayed root menu, the "quit" key rewrites the same screen.

The alarm acknowledge key is effective whenever an unacknowledged alarm is present. It always acknowledges the alarm currently visible at the bottom of the screen; the operator has no choice of which alarm to acknowledge. If no unacknowledged alarm is present, this key has no effect.

Following log-in, the system displays the level one menu. From this screen, the operator selects an item with a single keystroke. In most cases, the system responds with a level two menu, in which a second keystroke fully identifies the requested command.

Once the command is fully identified, the system echoes the full English text of the command on the command line, followed on the same line by a prompt for any parameters, such as cardlabel, that are needed in order to begin executing.

After the parameters(s), if any, are acquired, the system replaces the level two menu with an appropriate standard form from screens 6–10, and accepts any appropriate input, until the operator signals either "execute" or "quit." Regardless of the terminating keystroke, the system then returns to the level one menu.

This is a summary list of all the system commands available to the operator, grouped according to their object. The command "issue a card" accepts a card-number from the operator, checks if for syntactic and semantic validity, and then presents a blank card form for data entry. The operator may enter data in any order; two of the fields (card label and card code) are required, and the system will not complete the command until these are filled.

The command "display a card" shows the contents of a designated card record at the terminal. It does not allow changes to the contents of the record.

The command "revise a card" allows revision of any field except the card label and the card code. Any changes become effective immediately.

The command "cancel (invalidate) a card" removes a card from the database.

The command "print" prints one, all, or a selected subrange of the card records on the system printer if one is installed. If none is installed, this command is not available, and does not appear on any menu.

The command "reset" clears both the use count and last reader accessed fields, for one or all cards.

All groups commands use the standard group-display form. The command "create a group" allows the operator to define a new schedule and set of readers, to which individual cards may be assigned.

The command "display a group" shows the schedule and readers associated with any existing group. It does not allow the operator to revise any of the displayed fields.

The command "revise a group" allows the operator to make changes to the schedule and to the readers assigned to a group. It will not allow either list to become empty.

The command "delete a group" clears all assignments from a specified group, and frees the group number to be redefined. The system will not complete the command if any cards or temporary passes are assigned to the group.

The command "print" prints one, all, or a subrange of the current group definitions on the system printer. If no printer is installed, this command is not available, and is not displayed on any menu.

Temporary passes are four-digit keycodes created by the system at the operator's request. They may be created, displayed, and deleted; only the group assignments, identification number, and expiration dates may be revised. By default, they expire at midnight of the day they are issued; longer expiration times must be explicitly specified at the time they are created. The maximum number of temporary passes active at any one time may not exceed 10% of the total card capacity of the system, i.e., 100 or 400. The use of these temporary pass commands is optional; some higher-security installations may prefer to issue "temporary" cards.

The command "issue a temporary pass" creates a four-digit keycode.

The command "display a temporary pass" shows the attributes of selected temporary passes, by keycode number.

The command "revise a temporary pass" allows the operator to revise the group assignments, identification number, and expiration date of any pass.

The command "cancel a temporary pass" renders a temporary pass, specified by its keycode, immediately invalid.

The command "print" prints one, all, or a subrange of the currently defined temporary passes on the system printer. If no printer is installed, this command is not available, and is not displayed on any menu.

The command "lock the console" logs out the current operator. While the terminal is locked, it does not accept any commands or alarm acknowledgements; it does, however, display alarms. If the internal alarm queues fill up, the system will automatically acknowledge and clear alarms at the head of the queue, and print messages indicating it has done so, to make room for incoming alarms.

The command "issue a system console pass" creates a new five-digit access code and assigns it an operator-entered access level and operator identifier. The system can hold up to thirty-two console passes.

The command "display the console passlist" shows the entire list of passcodes currently assigned, with their associated cardholder numbers and access levels.

The command "cancel a console pass" removes a passcode from the list of those currently assigned. If the passcode belongs to the current system operator, the cancellation does not become effective until he locks the console.

The command "revise the console access-level privileges" allows an operator at the highest access level to revise the mapping of commands to access levels, for all commands other than itself.

The most important attribute of a reader is its physical address, which is set by a dual inline package (DIP) switch at the reader unit itself. This physical address is used in the control program to index an array of records containing software-defined attributes such as access method, antipassback test flag, follow-set, etc.

The command "add reader" allows the operator to define the attributes of a new reader in the system, and directs the system to begin polling the reader.

The command "display reader" shows the current software attributes and the hardware states of a designated reader.

The command "revise reader attributes" allows the operator to change the value of any reader attribute except its physical address.

The command "delete reader" removes a reader definition from the database, and directs the system to cease polling that reader.

The command "print" prints one or all of the currently installed reader attribute records on the system printer. If no printer is installed, this command is not available, and is not displayed on any menu.

The command "set the system time" accepts a time argument from the operator and then sets both the console clock and all reader clocks to the value supplied.

The command "set the system date" accepts a date argument from the operator and sets the console clock to that date. If the system is in normal operation, it immediately updates all current-schedule information to reflect the new date.

The command "set the holiday calendar" allows the operator to specify any one or more days of the current year as "holidays". The system does not check whether the designated day is earlier than the current date and therefore vacuous.

The command "display the holiday calendar" displays all currently designated holidays.

These, plus the "set system time" command, are the only operator commands that act, in real time, directly on the installed system hardware.

The command "set auxiliary line" directs an individual reader to set its auxiliary output line high.

The command "reset auxiliary line" directs an individual reader to set its auxiliary output line low.

The command "unlock a door" directs an individual reader to unlock its associated door. A default time period is stored in the reader but may be overridden by an explicit command parameter.

The command "lock a door" directs an individual reader, or all readers, to lock their associated doors.

The command "display system log" shows the current contents of the history log, filtered according to the defaults specified in the last preceding "change system log" command. The operator cannot change anything that is already in the log. The operator may override the default display switches, however, at the time he issues the command.

The command "change system log" sets the default specifications for which classes of events are to be displayed from the queue and which are to be printed.

The system detects and announces a number of anomalous conditions that may arise from hardware faults, erroneous or illegal access requests, and system software faults. Reader alarms, accesses, and errors are communicated with the TP 550 through mailbox 408. It is the system operator's responsibility to take any actions prescribed. Since these may vary a great deal from one installation to another, the system itself is designed to allow the greatest possible flexibility in operator response sequences. The definition has to satisfy a number of ergonomic criteria. It would be well to begin by listing these:

(a) the static visual structure must be easily absorbed and understood, on an intuitive level;

(b) items of greater importance must win out over items of lesser importance in the competition for display space;

(c) the effect of operator actions must be immediately and dynamically echoed, by visual cues that are clearly and intuitively distinguishable from each other.

The data and display structures involved are:

A number of alarm types; each type has a fixed priority level. There are three priority levels.

At runtime, the system generates alarm reports. Each report consists of a type, priority, timestamp, and other individuating data such as card number, reader number, etc.

For each priority level, an alarm queue holding up to twenty unacknowledged alarm reports. There are thus three such alarm queues.

The preceding terms refer to data structures. The following terms refer to display structures:

An annunciator, consisting of the bottom three lines of the terminal display. This annunciator is a constant element of the display; it is always present, even when it is empty of alarms, and it cannot be overridden by any other display element.

The first line of this annunciator displays the report at the head of the highest-priority non-empty queue. The third line holds the most recently acknowledged alarm. The second line is a blank line to enhance readability.

A history log, which the operator may access by a menu command. It is intended primarily to provide the operator with a list (if he needs one) of the alarms he has most recently acknowledged, together with a log of recently executed commands. The system functions perfectly even if the operator never accesses this screen.

It follows that the operator does not, and cannot, input any significant data via the history screen. The system gives him some convenient methods of controlling the display, to enable him to use it easily, but these exist only to serve one purpose: reviewing the most recent alarm reports and the action he has taken to respond to them.

Nevertheless, since clearly the history screen may be in use for extended periods, the system allows (by the constant presence of the annunciator) for the handling of new alarms that occur during such periods.

New alarms are added to the tail of their priority queue. The oldest unacknowledged alarm in each queue is always at the head of the queue, to be displayed in the annunciator if the higher-priority queues are empty.

The system can announce an alarm at any time, even when the operator is in the middle of a command sequence, but saves and restores the display context so that the operator does not perceive any interruption of his command.

An operator acknowledge signal (a single keystroke) always acknowledges the alarm report in the annunciator. The system accepts this keystroke at any time, even during command execution and data entry.

The acknowledged report is immediately moved to the third line of the annunciator, and replaced in the first line by the next queued alarm, if there is one. The report is also inserted into the history log; the operator may display this log at any time to review recently acknowledged alarms at his leisure.

When the history queue becomes 80% full, the system displays a warning message.

If any queue overflows, the system will automatically log out the oldest alarm in the queue as "autoacknowledged", print a report to that effect, and then delete it from the queue to make room for the most recent alarm at that priority level.

If such an overflow occurs during a period when the terminal is locked, the system displays a message containing a count of the number of automatically logged-out alarms and the timestamp of the first and last ones.

The operator is continuously informed of the number of unacknowledged alarms pending. For this purpose, the leftmost columns in the annunciator are reserved to display the number of unacknowledged alarms in the queue.

The system according to the present invention supports an optional printer 82 for logging console operations and alarms.

All operator commands generate (subject to the current log attributes as specified by the most recent "change log" command) hardcopy at the moment of their completion. The hardcopy contains: (a) the current time and data; and (b) a copy of the command line and its parameters if any. Aborted commands, however, never generate hardcopy, nor do data revisions prior to completion of any single command, nor do operator error messages.

The hardcopy log records operator commands that change the database; but it does not log the changes themselves. Hardcopy of the database contents is available only by explicit "print" commands, and these commands are governed by the same access-privilege mechanisms as all other operator commands.

All print commands that generate multiple-record printouts may be aborted.

An operator log-in sequence generates a line of eight asterisks, followed by a line containing the current time and the words "operator log-in" (where the string represents the identifier number associated with the operator's console password), followed by another line of eighty asterisks.

A log-out ("lock the console") command generates a similar hardcopy with the word "log-out" instead of "log-in."

Incoming alarms generate a line of copy at the moment the alarm is acknowledged. If the acknowledge results from a queue overflow rather than an operator action, an "*" is added to the line.

Alarm hardcopy continues even when the console is locked. Since during such periods the system does not accept operator acknowledge signals, all acknowledge operations reported while the console is locked will result from queue overflow, or with the messages routed directly to the printer.

Alarm annunciation on the console display 101 always takes priority over any other display activity. At the printer, however, alarm hardcopy yields priority, piecemeal, to any in-process command log or data printout. The smallest "unit" of printable data is a complete data record, command line, or alarm report. If a large batch of data is in process, alarm reports may queue up in the history queue and may require the system to interrupt a lengthy database printout. The alarm dump is guaranteed to begin and end on a page boundary, after which the database printout resumes.

These priority arrangements guarantee that alarms acknowledged "during" a command (as perceived by the system operator) will precede, in the hardcopy, the command report, since the command is not queued for printing until the system receives the operator's final "exec" keystroke.

The system stores the most recent 250 events (operator commands, normal transactions, and alarms) in a history queue. The contents of this queue provide all hardcopy output except what results from "print" commands. The operator may request display of this queue on the terminal and can scroll at will throughout the entire queue. A modal command defines the set of events that are to be printed, and the set of events to be made available on the display. From the union of these two sets, the system constructs the set of events to be included in the queue.

If the queue becomes 80% full (of unprinted material), the system displays a warning message and reverts to inserting only the highest priority reports into the queue.

The event types that may be specified for print and/or display are normal transactions (low priority); alarms, low priority; alarms, high priority; alarms, intermediate priority; operator commands, realtime control; read database; and write database.

The terminal manager pseudocode is shown in Appendix I, where the source code for the TM is split into four submodules: TM1.PAS, TM2.PAS, TM3.PAS, and TM4.PAS. Constants, types, and external utility routines are declared in each submodule as they are needed.

The code in TM1 includes:

the main routine (i.e. top-level loop in TM);

routines to handle the system log;
routines to handle alpha-variable displays;
routines for menu display and selection;
routine to execute menu items; and
routines to display database records.

The code in TM2 includes:

routine to handle the operator login sequence;
routines to handle the display and manipulation of reader and group lists;
routine to check valid dates;
routine to get command line data; and
routines to handle the manipulation of database records.

The code in TM3 includes:

routines to handle alarm messages;
routines to handle, send, and receive messages to and from tasks;
routine to check the keyboard for characters;
routines to get integer data entered at keyboard; and
routines to handle the manipulation of command priorities.

The code in TM4 includes:

routine to handle th reader state table;
routine to get parameter data for test mode;
routine to initialize alarm line variables;
routines to display alarm lines; and
routine to write strings to display screen.

DATA BASE MANAGER DESCRIPTION

Figure 6:
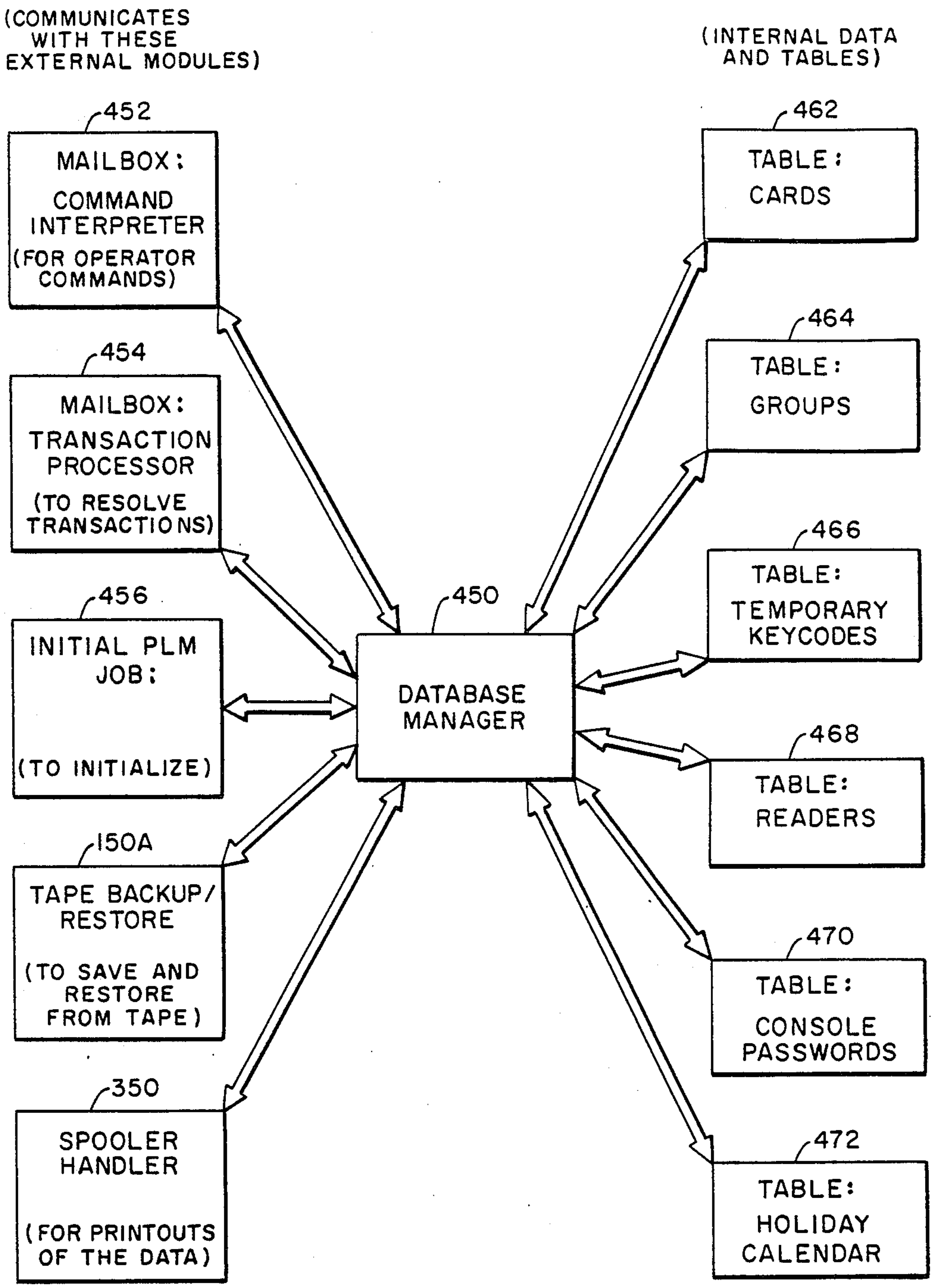
FIG. 6 is a diagram showing the exchange of data for the database manager shown in FIG. 4.

The Data Base Manager (DM)450 of FIG. 6 according to the present invention creates, maintains and controls access to six data bases of information used by the console system listed below. The DM has four main functions: find, insert, delete and update elements of the database. If also performs additional functions associated with maintenance and sequential listing of this data. Upon reception of this task, the module returns a message to the sending module containing a return code and the appropriate data. The Database Manager contains the following six data bases or tables:

1. The Card Data Base, 462: information on individual magnetic cards.
2. The Group Table, 464: a list of Readers allowable for a group of cards, and schedules of times these readers may be accessed.
3. The Temporary Keycode Data Base, 466: information on temporary keycodes issued to allow access to a selected set of readers for a limited period of time.
4. The Console PASSCODE Table, 470: a list of legal console operator PASSCODES.
5. The Reader Attribute Table, 468: information on each reader; what combination of card/keycode is required for access, of antipassback checking is enabled, and the list of readers that can precede the current one.
6. The Holiday Calendar Table, 472: a list of up to 30 dates that are to be considered holidays by the Console system.

All actions of the DM 450 are initiated by the arrival of a message requesting the search and access of some data record. The majority of these requests will be from a transaction processor 550, which accesses the data bases repeatedly every time an access request ("card" or "keycode") is presented. Because of the real-time nature of access requests, any messages coming from the transaction processor receive first priority. This is accomplished through the system which assigns priorities to each of the system modules. Since the transaction processor gets highest priority, any messages it sends to the DM will go to the head of the message queue.

The Transaction Processor will request a reader record 468, one or more group records 464, a card record or a temporary keycode record 466. At the successful conclusion of a card access request, the card record must be updated.

Second priority messages come from the Command Interpreter 500, which is handling a data request stemming from a Operator command. According to his level of access, the Operator can add or modify records in all the data bases. He may also wish to display or list records from various data bases.

When an operator attempts to enter the system, the Command Interpreter queries a Console passcode data base 470 to see of the operator is allowed on the system, and determine his access level to commands.

The Data Manager 450 is an integral part of the access system. When a card or keycode transaction is started, the Transaction Processor module sends a series of messages to the Data Base manager to see (a) if the card is valid, (b) if the card is allowed at that reader, (c) if this card is allowed access at this time of day, and (d) if the user should also enter a keycode. This requires a number of message exchanges between the two modules.

The DM 450 is also accessed when the console operator issues commands through mailbox 452 to display, add, or modify system information. Via two modules, the Terminal Manager 400 and the Command Interpreter 500, request to find, insert, delete and other opcodes are transmitted to the Data Manager 450. Responses are fitted back to the Console Operator via the same pathway.

The DM is accessed by the Tape Backup and Restore Module (TB) 458 which saves the data base information on a magnetic tape cassette. This module sends find messages to the DM to retrieve all the data base information. When the Console Operator requests a restore system data, the magnetic cassette tape will be read and the information retrieved will be sent as a series of inserts to the DM. For full specifications of this activity, please refer to the Tape Backup and Restore Module.

The operation of the DM is based on two variables, "mtype" (message type) and "opcode" (operation code). A database request is specified by "mtype" and what data item field within that data base is to be used as the search and selection variable; opcode specifies what operation is to be performed, such as find, insert, and delete. Different mtypes (data base and field) allow different opcodes (operations).

The Printer Handler (PH) 551 has two interactions with the Terminal Manager 400. First, as mentioned previously, the PH and the Terminal Manager 100 share a common data queue, the System Queue, which is not only storage for the last 250 transactions in the system, but is also the system printer queue. The PH will continually print the System Queue, as long as it has unprinted items left.

The second interaction only occurs when the printer hardware is not responding to characters sent to it. The PH in this case an alarm message to the Terminal Manager 400 informing it that the printer is down.

If the System Queue becomes greater than 40 percent full of unprinted items while the PH is processing a long detabase printout, the PH will switch intermittently to printing the System Queue. This will insure that the System Queue will never overflow.

If the system Queue becomes 80 percent full of unprinted items due to the printer being off-line, jammed paper, or any other printer problems, the System Queue automatically saves only priority one alarms.

At any time during a database printout, the operator may abort the print job. Whatever record was printing during the abort will be completed, and the abort will be logged on the printout after this last record.

The data manager structure and design is shown in Appendix II.

The data manager is physically composed of three separate modules. The card database is restricted to the third module, DM3.P. Briefly, these modules are:

DM1.P: The top end module, with the internal name: procedure dmmain. This module receives messages and decodes them. It call a procedure named "Interprt" to actually interpret the message. "Interprt" supplies a return code, and "procedure dmmain" sends a return message with the appropriate information.

DM2.P: This module contains procedure "Interpret" which performs all the functions necessary for the data base manager. DM2.P physically contains all the databases except the card database, which is segregated because of its size.

DM3.P: This module is a library file of routines called by "Interprt" in Module DM2.P. All these routines pertain to the card database which is contained physically in this module. The card database is compressed and the routines in this module send back a single card record image, named "cardfound," full of the information requested. It was necessary to compress and segregate the card database in order to save space.

The printer interface software transfers information between the system terminal manager (TM) 550 and the system line printer 64. It utilizes a single interrupt line from the 8251 USART 96 on the network control board (NCB) 80, the services of the slave 8259A interrupt controller chip (PIC) 98 on the NCB, and an RS-232C link between the board and the printer. It can buffer up to 1024 characters from the TM, and, through the use of the DSR line on the USART, can determine whether the printer is powered up and/or connected to the system. It is connected to the printer (typically a Manneman-Talley MT-160) via serial port 1 on the NCB.

The printer baud rate is generated by an 8253 counter-timer chip (PIT) 94 located on the NCB, even-addressed at 230H (channel 0) to 236H (control channel). Channel 0 of the PIT is used to generate the Tx and Rx clocks to the USART. The input frequency to the PIT is derived from a 22.1184-MHz crystal/8224 clock generator, divided by a 7474 D-type flip-flop, giving a PIT input frequency of 1.2288 MHz. The PIT is programmed to divide by either 256 (for 300 baud) or 64 (for 1200 baud). The USART is configured as follows: asynchronous, no parity, 8 data bits, 1 stop bit, 16x clock (mode instruction code 4Eh); transmit and receive enabled, DTR and RTS forced low (command instruction code **37*h***). Currently, these PIT and USART options are hard-coded into the printer driver.

The USART TxRDY (transmit ready) pin is used as the interrupt signal to PIC interrupt level 2. This PIC 104 is configured by the nucleus to respond to level-triggered interrupts.

The software interface of the printer driver is divided into two parts; the initialization task, and the high-level character buffer input routine. The initialization task is invoked at system startup. It sets up the PIT and USART for the proper baud rate and control functions, respectively, and then suspends itself.

The high-level character buffer input routine is accessible as a called routine from the TM. It accepts as input parameters the length of the character string to be output (integer value) and a pointer to the start of the string (pointer value). It returns a word value depending on the action taken: 0 if no error; 1 if the new character string would exceed available buffer capacity (1024 characters); or 2 if the printer is not connected. Assuming no errors, the new input string is appended to the end of the internal circular buffer, ready to be passed out to the printer when requested by the interrupt service routine. Then the enable status of the interrupt routine is examined; if it is disabled, the first character is the buffer is sent out to the printer, and the interrupt level is enabled.

The interrupt service routine is invoked (if enabled) whenever the TxRDY line from the USART goes active by a signal at 108 causing PIC 104 to provide an interrupt at 114. The routine examines the head and tail pointers of the printer output queue; if they are equal, there are no characters to be output to the printer, and the routine disables itself before returning. If the pointers are unequal, the routine takes the next character (pointed to by the head pointer), outputs it to the USART, and returns.

The Printer Handler automatically ejects the pages on System Queue and Database printouts, and numbers the pages on all Database printouts.

Command Interpreter Description

The command interpreter (CI) 500 of FIG. 8 communicates directly with the DM 450, TM 400, and TP 550, but not the PM 60A. In addition, it communicates with the printer spooler (SP) 350, the tape backup/restore module (TB) 150A, the terminal handler (TH) 370, and the printer handler (PH) 551. The system also includes interrupt routines, utility routines, etc. The CI communicates to all these modules through the DM and TP mailboxes 508 and 510.

The command interpreter is the intelligence behind the operator's console. While the TM controls the exact positioning and format of items displayed on the console, the CI controls the sequence and the contents of these displays. The CI performs all required database manipulations, as well as various timing functions, such as maintaining the console time and date displays. The CI communicates with the TP to obtain testmode information.

External utility routines are used by the CI to communicate with the other modules via the system mailboxes, to examine and set the system real-time clock, and to call a procedure indirectly by its address. These utilities, and many others, are packaged together and are used by every module in the system.

The CI engages in a tight dialogue with the TM through the TM mailbox 502, communicating with the DM when information from the database is needed. One of the most common activities of the CI is to perform a command which the operator has selected from the main menu, such as when the CI tells the TM to display the current menu, according to the command logic 504 and the current command state 506.

The TM displays the menu, the then waits for an item to be selected (for example, "add a card"). The TM then prompts for the number and type of parameters appropriate to this command (checking for validity and allowing corrections), and then passes the command and its parameters to the CI.

Typically, the command wall require a record from the database. The CI requests the needed record, and awaits the DM reply.

After the DM supplies the record, the CI passes the information to the TM through mailbox 510, along with an indication of what format should be used to display the record.

The TM allows the various fields of the record to be entered/changed, passing their values to the CI as they are entered.

When the operator is finished with the record, the CI replaces/inserts it into the database, waits for the DM response, and informs the TM that the command was successful (the TM records successful commands in the system log).

The CI then tells the TM to redisplay the current menu, and to wait for another command.

"Log-in" and "Testmode" are just special cases of the same scenario: On log-in, the log-in screen is displayed instead of the main menu. Only one "item" may be "selected": "Password XXXXX Presented," The CI looks the password up in the database, and if it is valid, tells the TM to put up the main menu.

"Testmode" works off of the Testmode menu, and the CI interacts with the TP rather than the DM to get information about the readers, etc. Also, Testmode is somewhat different, since the messages from the TP are less predictable: the DM speaks only when spoken to; TP messages result from spontaneous reader activity.

Sequencing through these dialogues is the major, and most important, activity of the command interpreter.

In addition to the modules described above, the CI has limited communication with two minor modules, the SP and the TB.

When a command is given to print a range of records from the database, the CI passes the request to the SP. The SP obtains the necessary records from the DM and passes them to the PH for printing, without any further interaction with the CI.

When a command to save the current database is received, the CI passes the request along to the TB. The TB performs the save, and informs the CI when it is done. During this interval, the CI does not permit any commands which could change the data base to be performed.

When a command to restore a previous database is received, the CI quiets down the system, and then passes the request along to the TB. The TB performs the restore, and informs the CI when it is done. During this interval, the CI does little but update the date and time on the console.

Finally, the CI relies on certain flags that are set by the startup task, flags which tell whether the printer exists, whether the tap unit exists, etc. The CI does not communicate directly with the startup task.

The system modules were designed to minimize the amount of information one module would have to know about each of the other modules. For example, the TP has no direct access to the console screen; the DM is concerned only with the proper manipulation of the records in the database; the TM does not talk to the DM at all. Likewise, there are several functions that the command interpreter does not do.

The CI does not see any alarms; they go straight from the TP to the TM for display. The CI does not know about actual menu appearance. To the CI, the normal command menu is one list of complete commands. The TM splits this list into several screens for display. The same holds true for the Testmode menu.

The CI does not check command parameters for validity; this is up to the TM. Further, the CI does not directly display anything upon the console, nor handle console input. The CI does not communicate with the PM, TH, or PH. The CI does not have anything to do with the system log, beyond informing the TM when a valid command is completed.

The command interpreter operation is shown in pseudocode in Appendix VI.

The CI must talk with the TM and the DM in order to process operator commands entered at the console. It also must keep an eye on the clock, in order to perform its time-dependent functions. Central to the CI is the concept of the "sequence." This is the sequence of steps necessary to complete operator commands. A detailed example was given above, but in general this sequence is:

Step 1: Wait for a command to be selected from the main menu.
Step 2: Retrieve necessary database record, if any.
Step 3: Display the record.
Step 4: Accept new fields and changed fields.
Step 5: Update the database record.
Step 6: Go back to the menu and wait for another command.
Step 7: Retrieve necessary database record, if any.
Etc.

While it is between steps, the command interpreter is waiting for a response from another module. During this time, the CI continuously runs through its time-related activities, checking if they need to be done. When the expected response is received, the CI performs the next step in sequence, and again waits. In this way, operator commands and the time functions appear to operate concurrently.

The CI must perform the following time-dependent activities:

update the console time every second;
update the console date at midnight (but, see next item);
refresh the console date every 15 minutes (in case the terminal screen is accidentally cleared);
refresh the readers' clocks every few minutes;
"Open Door N for M minutes": close the door after M minutes;
Detect midnight: expire temporary passes and reset card use limits in the database; and
maintain the code "alarmclock" (see below).

The CI is continually checking the time (when it doesn't have anything else to do). It keeps track of the value of "minutes" the last time it looked. If this changes, then a minute has elapsed. Midnight is detected when the date changes from the last time the CI looked.

Downcounters are used to control "refresh" and strike-timing. A counter is loaded with a value, and then decremented once every minute. Once the counter reaches zero, the activity is performed. For example, "Open Door 7 for 5 Minutes." The door is opened, and value 5 is placed into the strike table entry for reader 7 (there is one entry for each reader). After 5 minutes, this value has reached zero and the door is closed. For Reader Clock Refresh, the readers' clocks tend to wander a bit, so the correct time is sent every 10 minutes. The number 10 is placed into the counter. After 10 minutes, the correct time is broadcast to the readers, and the counter is again set to 10.

A similar mechanism is used for a code "alarmclock," except the resolution is seconds rather than minutes. At one point in command processing, the CI must request some information from a given reader for display on the console. Unlike the software modules, the reader is not guaranteed to reply. If this happens, the CI must continue its sequence, without waiting forever for this response. This is handled by the code "alarmclock": this counter is decremented once every second; if the counter reaches zero before the reader replies, the CI assumes that communication is faulty and continues processing.

Since many of the time-related activities are implemented as downcounters, they are not affected by changes in the absolute system time.

Transaction Processor Description

The primary function of the Transaction Processor (TP) 550 of FIG. 8 is to process card-based and keycode-based access transactions originating at the system's online readers. In addition, the TP reports to the Terminal Manager 400 error conditions detected by the readers and the Polling Machine (PM) 60A, and performs "test mode" reader manipulations under the direction of the Command Interpreter (CI) 500.

Access transaction requests originate at the readers, and are passed along to the TP by the PM at block 554. The TP communicates with the DM through mailbox 560 to validate the request, and sends a message back to the reader through the PM from block 402 to grant or deny access. This is the major activity of the TP. In addition to the DM and PM, the TP talks to the TM and the CI through mailbox 414 and 412, respectively. Notification of all accesses and attempted accesses is sent to the TM for display. These messages may be alarms (ie, error conditions or invalid access) or merely informational (ie, normal conditions and valid accesses). The TM does not send messages back to the TP.

The CI sends messages to the TP to regulate reader polling, set the readers' clocks, and to inform the TP of the day of the week. In addition, there is a complete set of "test mode" messages from the CI. The TP passes these messages along to the reader, and passes the responses (if any) back to the CI.

The TP does not have direct access to the operator's console. All alarms go through the TM for display. Moreover, the TP does not talk to the readers. All messages go through the PM, talk to the "spooler" or "printer handler" 551 modules, talk to the "tape backup/restore" module 150A, or talk to the initial RMX "startup" job.

The transaction processor pseudocode is shown in Appendix III.

The source code for the TP is split into two submodules: TP1.P and TP2.P. Practically all the variables used in the TP are declared in TP1, since they are used by both submodules. The Transaction Information Table is referenced only in TP2 and is therefore declared in TP2. Constants, types, and external utility routines are declared in each submodule as they are needed. The code in TP1 includes:

common routines needed by both submodules, i.e., the routines to send messages to other modules, the routine to cancel a transaction;

routines to initialize the TP;

routines to handle messages from the CI; and the top-level "main" TP routine.

The code in TP2 includes routines to process transactions and routines to handle messages from the PM.

CI messages regulate polling and request "test mode" information. CM messages supply transaction information. PM messages initiate transactions, report reader conditions, and supply "test mode" responses.

The pseudocode describes transaction processing. Note that between "steps" of a transaction, the TP is waiting for a response from either the DM or the PM, and is off doing other things: reading other messages, processing other transactions, etc.

The poll machine 60 and 60A (hereafter referred to as PM) is a bidirectional conduit which interfaces between the 8086-based Cardgard (trademark of American District Telegraph Company) console 52 and the 8051-based card readers 70-70N. Basing itself on the 8051 and residing in the NCB 60, it will transfer commands from the console to the card readers, and the replies from the card readers to the console. In addition, it can recognize certain commands from the console to itself, and will return certain status messages to the console.

During normal operation, the PM 60A will poll each enabled reader 70 in turn with a "status request" message. If no transaction or new abnormality exists at the reader, it will reply with a "no charge of state" message. The PM filters out these "no change of state" messages (ie, it does not pass them up to the console). When a console sends certain commands to a reader, the reader will respond with an "acknowledge" message. The PM also filters these "acknowledge" messages.

To send a message to a reader, the console sends a "console-to-reader" message to the PM. Whenever the console sends a message to a reader, the normal polling sequence is interrupted and the message to the reader is transmitted instead of the next "status request" poll. Thus, it is possible for a reader to be polled once and then immediately receive a message from the console (or vice versa). Once the message is transmitted, the PM returns to the polling cycle at the point where it was interrupted (ie, the next reader on line).

Figure 10:
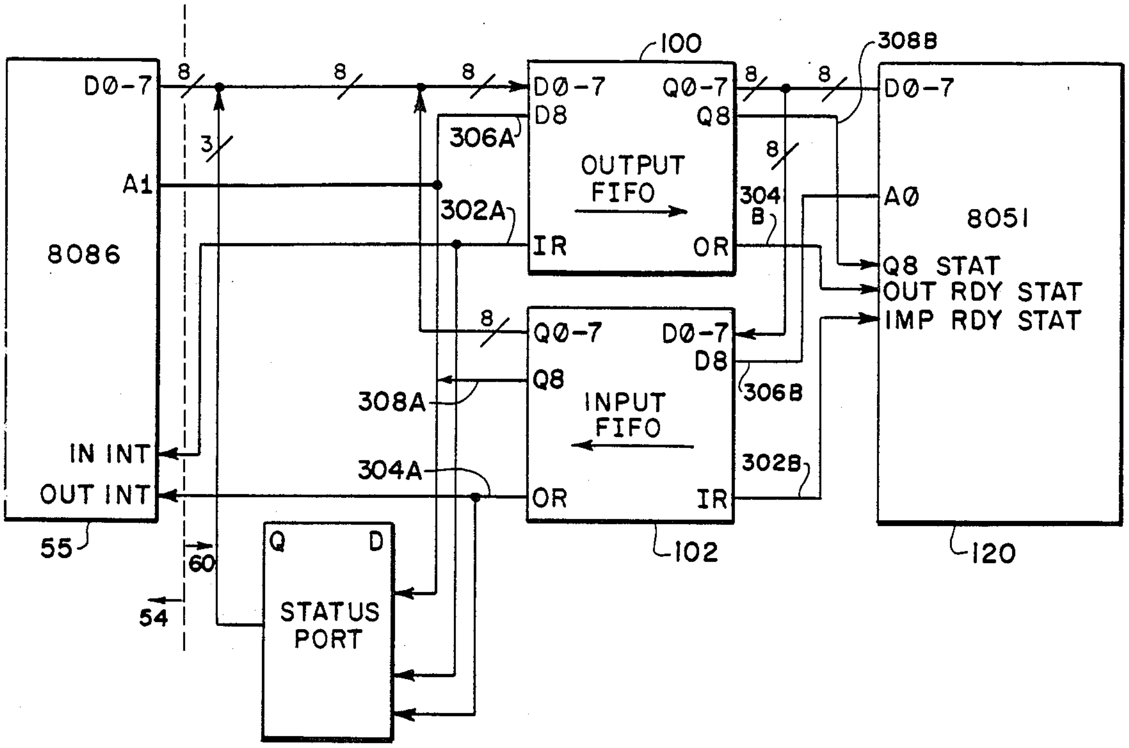
FIG. 10 is a simplified block diagram of the first-in-first-out (FIFO) register of the NCB subsystem shown in FIG. 2.

All messages that pass between the PM and the console go through dual 9-bit wide, 32-word deep unidirectional FIFOs (100 and 102 of FIG. 2 and 10). Because the message lengths can vary, some method of frame checking is necessary to prevent message overlap. To accomplish this, every message is sent with a leading count byte, which contains the number of data bytes in the messages that follow. This count byte is distinguished by having its ninth bit set high; the following data bytes all have their ninth bit set low. This allows both sides of the FIFO to "packetsize" their information, and allows checking of FIFO integrity (if too few or too many data bytes come in, there is possible hardware corruption).

In order to distinguish between messages directed to/from the pollmachine and the readers, the first data byte of every message must have its high-order (ie, eighth) bit set accordingly. Because there are a maximum of N readers, this bit is zero for reader commands/messages. For PM commands/messages, this bit is a one.

The PM monitors the status of each message from the readers to determine if the reader and/or the data link connecting the PM and the readers is fully functional. The PM is capable of determining two types of faults: reader response timeout (readers fails to respond within a certain period of time); and corruption of the reader response (either an invalid type of response or an incorrect xorsum check). The PM maintains a "reader table" entry for each of up to 48 readers. Each entry is one byte in length, with certain bit fields indicating the current status of the reader. One of these fields, the "sickbay" field, is a two-bit counter. Whenever a reader fails to produce a valid response, this counter is incremented (up to a maximum count of 3). Whenever a reader produces a valid response, the counter is decremented (down to a minimum of O). When it has incremented to three, the PM declares the reader sick, and a message to that effect is sent to the console. Once a reader has been declared sick, if the counter decrements down to O (i.e., the reader performs at least three valid responses in a row) the reader is declared well again, and a message to that effect is sent to the console.

According to the present invention, the system 50A controls the card reader 70 as follows:

For gaining access (during both normal operations and degraded mode), if a card is not required to gain access, skip step (1).

(1) The user presents his access card to the reader. If the card is permitted to access the reader at this time, the green "Go" LED will light and the strike will operate if a keycode is not required. If the reader is in degraded mode, the reader must be set to allow degraded mode access, in order for the user to gain entry.

(2) If a code required, it may now be keyed in. The reader will prompt a card-and-keycode user for his keycode, when required, by displaying blanks in all four digits of the display. If the user fails to initiate keycode entry within 30 seconds, or once he has initiated keycode entry, if he fails to enter a key within 15 seconds of the previous key, the reader will timeout and display the clock. If an error is made while typing in the keycode, the user may enter the Clear key which will abort the current attempt and increment the keyboard error count. The user may then reenter the code until the proper code has been entered, or until the keyboard error limit has been exceeded. If the keyboard error limit is enabled (settable 1-10) and exceeded the keyboard is disabled for one minute, and the alarm output is activated. If a key is pressed while the keyboard is disabled, the red LED will light for a brief moment.

A keypad layout and command syntax guide are given below.

Communications: Console and Polling Machine

The two FIFOs 100 and 102 are each 9 bits wide by 32 bytes deep. Eight bits (DO-D7) are used for data transfer, while the ninth bit is used to differentiate between count and data bytes. Each data packet consists of a count byte (ninth bit set), followed by the specified number of data bytes. These data bytes are typically a command byte followed by 0 or more parameter bytes. This scheme allows both processors to handle variable length packets, and gives some measure of tolerance to packet framing errors; if a count byte arrives when a data byte is expected, or vice versa, the system can recognize (and compensate for) the problem.

Simplified portions of NCB 60 of FIG. 2 and computer 54 of FIG. 1 are shown in FIG. 10. The IR and OR (Input Ready and Output Ready) signals are used to inform the two processors of the FIFO status. The IR on lead 302A and OR on lead 304A on the computer 54 (having an Intel 8086 55 within) side are interrupt sources, while on the MPU 120, 8051 side IR lead 203B and OR lead 304B are polled status lines. The D8 and Q8 lines 306A,B and 308A,B carry that ninth bit which differentiates between count and data bytes. All lines 302A, 304A, 306A, 308A and 302B, 304B, 306B, 308B for both processors 55 and 120, respectively, can be monitored from a status port.

The routine which inputs data from the FIFO attempts to input an entire data packet for each interrupt. When a byte arrives at the output of the input FIFO 100, the input interrupt line is toggled. The 8086 processor 55 responds by jumping to an interrupt handler, a software routine which will input data from the FIFO 100. This interrupt handler first checks whether or not the byte at the FIFO 100 is a count byte. If it is not a count byte, the interrupt handler flushes the offending byte out of the buffer and exits. If it is a count byte, the interrupt handler proceeds to input the specified number of data bytes; and if any of these are count bytes, the routine is exited and the input is thereby aborted. If all goes correctly, a system message containing the data from the FIFO 100 is sent when the proper number of data bytes, according to the count byte have been received if not, an error signal is generated.

The FIFO output routine is somewhat simpler than the input routine. All messages to go the FIFO 102 are kept in a circular queue, which contains not only the byte to go to the FIFO, but also information which indicates whether the byte is a count byte or a data byte. Whenever the output FIFO 102 is ready to accept data, it toggles the IR line, activating the FIFO 102 output interrupt handler. This process takes the next byte off the queue waiting to go to the output FIFO 102, and puts it into the FIFO 102 as either a count byte or data byte (as indicated). If no data is waiting on the queue, the interrupt handler exits without performing any action.

The FIFO input and output routines in the 8051 120 are less complex than their 8086-based counterparts. Since neither of the 8051 routines are interrupt-based, no circular queues are necessary. For input, the 8051 does check for the proper order of count and data bytes (like the 8086 55), and disregards improperly framed messages. For output, the FIFO output routines will wait (synchronously) for the FIFO to be ready before outputting data.

A FIFO interface (FI) is responsible for passing information back and forth between the polling machine (PM) 60A and the transaction processor (TP) 550. The information flow between the FI and the PM is via two 9-bit×32 FIFO chips (AMD AM2813s) located on the network control board (NCB). Both the input and output FIFO functions are interrupt driven, using the slave interrupt controller chip (PIC) 104 located on the NCB. The interface between the FI and the TP is via the console operating system mailbox structure.

The FI hardware interface consists of the two FIFO circuits 100 and 102, the NCB multibus interface circuitry, the interrupt controller 104, and the Multibus I/O data path. For the remainder of this discussion, the term "input FIFO" will refer to the FIFO 102 conducting data from the PM into the FI, and the term "output FIFO" will refer to the FIFO 100 conducting data from the FI to the PM.

Each FIFO chip consists of 9 data input lines; 9 data output lines; input and output control strobe lines; and input ready, output ready, and half-full status lines. (The half-full status lines are used neither by the FI nor the PM.) The ninth data bit us used as a framing flag; when set, it indicates that start of a message packet (the count byte).

The FIFO interface appears to the system as two interrupt sources, a bidirectiona ldata port, a count port, and a status port. The data port appears at NCB$base+50h (0250h on the current implementation); the count port at NCB$base+52h (0252h); and the status port at NCB$base+70h (0257h). The data port passes the eight-bit data between the FI and the PM. The count port carries, in parallel with the data, the framing (or count byte) flag. The status port carries three status flags: input FIFO Q8 (bit 7); input FIFO Input Ready (bit 6); and output FIFO Output Ready (bit 3). The two lines which are used as interrupt signal sources are the input ready line of the output FIFO, and the output ready line of the input FIFO. The input ready line is tied to input 4, and the output ready line is tied to input 0 of the NCB 60 slave PIC 104.

The 8086, 55 software interface to the FI consists of a mailbox, named pm$mailbox. In a properly functioning system, the FI communicates only with the transaction processor mailbox, or tp$mailbox. The messages between the FI and TP are in the following format:

| | | |
|---|---|---|
| whom$from | integer | mailbox segment of sending routine |
| opcode | integer | command code |
| reader | integer | 0–48 for reader command;<br>255 for PM command |
| count | integer | number of following arguments |
| arg | integer | the arguments (05) |

Both the input and output routines handle as many bytes as possible at one time, in order to reduce interrupt handler "byte-banging" and the resulting system overhead. Both routines transform the data between the PM format and the TP format. See the appendices for more details on the PM FIFO message format.

The 8086, 55 software interface to the FI consists of a mailbox, named pm$mailbox. In a properly functioning system, the FI communicates only with the transaction processor mailbox, or tp$mailbox. The messages between the FI and TP are in the following format:

| | | |
|---|---|---|
| whom$from | integer | mailbox segment of sending routine |
| opcode | integer | command code |
| reader | integer | 0–48 for reader command;<br>255 for PM command |
| count | integer | number of following arguments |
| arg | integer | the arguments (05) |

Both the input and output routines handle as many bytes as possible at one time, in order to reduce interrupt handler "byte-banging" and the resulting system overhead. Both routines transform the data between the PM format and the TP format. See the appendices for more details on the PM FIFO message format.

The input routine is activated by a singal$interrupt from the input interrupt handler. It examines the first data byte in the input queue to see whether or not it is a PM status response (byte greater than 127) or a reader message (byte less than 128). It messages the input accordingly into the above TP message format, sends it off in a mailbox, and then waits all over again for a signal$interrupt from the input interrupt handler.

The output routine transforms the message into either reader command or PM command format, places it on the output queue, and checks the must$tickle flag. If must$tickle is false, nothing happens. If must$tickle is true, the routine outputs the first byte on the queue to the output FIFO (to trigger the edge triggered interrupt), adjusts the queue head pointer, and goes back to waiting for another mailbox message from the TP.

The input FIFO interrupt routine is triggered whenever a byte comes down from the input FIFO. The routine first checks whether or not the byte is a count byte; if not, it is discarded and the system waits for another byte. If the input is a count byte, the routine waits for count data bytes to come in from the input FIFO, puts them on the input FIFO queue, and signals FIFO interrupt task that a complete message has been received. The output FIFO interrupt routine first checks whether or not the output FIFO queue is empty. If so, it sets a flag (must$tickle) and exits. If not, it outputs bytes (count and data) from the output FIFO queue into the output FIFO until the output FIFO queue is empty. Then it sets the must$tickle flag and exits.

Tape Backup/Restore Module Description

The system includes provisions for the use, whether by temporary or permanent connection, of a mass-storage device for data initialization and backup. The currently specified backup device is a tape cartridge unit 66.

The module 150A has the responsibility of backing up and retrieving the volatile data base information stored in the Data Manager Module (DM). This is the only information that need be stored. All other modules self-initialize when started. The data bases affected are the card data base, the group table, the temporary keycode data base, the password table, the reader table, and the holiday calendar table.

Tape Drive

The tape driver interface, or tape handler (TH)152, is responsible for communicating information to and receiving information from the hardware tape controller (HTC). It exists as an interrupt task with an associated interrupt handler.

In normal operation, the TH will receive a system mailbox message from the tape backup/restore module (TBR) 150A which will contain one of the following messages:

1. read a block
2. write a block
3. initialize tape cartridge
4. backspace the tape one block
5. rewind the tape
6. unload the tape The TH will then communciate the command to the HTC, and get the completion status and data (if any) from the HTC upon completion of the command.

In order to use this module, the HTC must be connected into the system. In the prototype system, the HTC is connected to the SBX connector 176 on the network control board (NCB) 80. A tape drive SBX interrupt line is used to convey interrupt signalling information, and is connected to input 5 of the slave PIC on the NCB. A 34-line flat cable connects between the HTC and the tape deck logic board.

The code for the TH can be described by the following pseudocode description:

```
initialize
do forever
  get mailbox message from TB
  send command/data to HTC
```

get response from HTC
send response to TB

When the mailbox message is received, it is copied into a local buffer and the mailbox is released. The command is then passed up to the HTC, and the code waits for an interrupt, signalling that the HTC has received the command. In the event of a "write block" command, data is also passed up to the HTC. The system then waits for another interrupt from the HTC, signifying that the HTC has completed the command. The completion status is read from the HTC, and, if the command was a "read block," the data from the tape. The status (and data, if applicable) is then mailed back to the TB.

The commands and status codes are given in the appendices.

The interrupt interface is very simple. When the interrupt occurs, the interrupt handler sends an acknowledge code to the HTC, waits until the interrupt (HTC ready) line clears, and then performs a signal$interrupt to return to the interrupt task.

The backup of the database information 151 is started by a command issued by the System Operator. When a "save system data base" command is used issued, the Tape Backup and Restore Module (TB) 150A requests the necessary information from the DM 450 and writes this information to a magnetic cartridge tape for storage, by sending messages to the tape handler module 152. Upon a "restore system data base" command, the TB sends messages to the tape handler requesting a series of reads from the magnetic cartridge tape. The information retrieved is sent by mail message to the TB. The TB then sends a series of inserts to the DM to replace the information in the proper data bases. The exact procedures involved in these tasks are described below.

This module acts as an interface with the EPI STR-610 magnetic cartridges tape mass storage device 66.

Communications with this tape handler 152 are initiated by sending an initialization message, which performs a rewind on the cartridge tape and the selection of Track O. A series of reads and writes are then performed. In order to minimize possible data errors, every block of data is written twice to insure the reliability of the tape backup. Should any unrecoverable error occur, the backup is cancelled and the operator prompted to use another tape.

After reception of every message, the tape handler responds with an acknowledgement message. Part of the system data is written on Track 0; the remainder is written on Track 1. When a backup or restore is finished, an unload message is sent to the tap handler, causing it to fast-forward the tape to its end, and then to suspend itself.

In order to prevent erroneous creation or deletion of mass storage data, it is recommended that a cartridge tape be removed from the drive after the completion of a backup or restore procedure. The console operator is prompted to insert a tape at the beginning of a tape operation.

When the console of the present system is powered up, an initialization vector starts up the initial Cardgard (trademark of American District Telegraph Company) job, and prompts the console operator as follows:

"Is there a tape backup attached to this system (Y/N)?"

"Do you want to restore the data base from tape (Y/N)?"

"Place the most current tape cartridge in the tape unit. Enter return key to start restore."

The system hardware will maintain power for 15 minutes, and to maintain the contents of the memory RAM for 48 hours, it is not always necessary to restore the system data bases after a power loss. Should the operator respond with a "no" to the "restore" prompt, the system starts up with the current data base configuration.

Should the operator answer "yes" to the "restore" prompt, he/she is prompted to enter a tape into the cartridge drive. The system waits until this task has been acknowledged by the operator entering a terminate character.

The initial job routine then initializes all the mailboxes, including new mailboxes for the tape backup and restore and tape handler (TH) modules 152. Next, the initial job routine starts the DM and TB routines. This initial job routine issues a message to the TB to start a restore of the data bases. The top level initial job routine then waits at its mailbox until the TB returns a message signifying a successful restoration of data. At this point, the initial job routine starts up all the other modules and suspends itself. Should an error occur during the tape restore, an error message is displayed and the initial job will wait for a response. The error message is:

"Error: tape restore failure"

"Enter return key to start system with faulty data base"

"For further information of tape error, examine alarms"

The operator can choose to continue the system and examine the alarm messages stemming from the restore. Another restore can be initiated from the menu of commands.

The tape backup/restore structure is shown in pseudocode in Appendix IV.

The tape backup and restore module is physically contained in a module named TBR.P. This module contains a sincle Pascal procedure named TBRMAIN. All functions of the TB are coded within this procedure TBRMAIN as subprocedures or functions.

The printer handler pseudocode is shown in Appendix V.

The source code for the PH is contained in one module: PH1.PAS. The code in PH1 includes the main routine (i.e. top-level loop in PH);
routines to handle the printing of the system log;
routines to handle database printouts;
routine to handle printer spooler error conditions;
routines to send acknowledgements to the printer spooler; and
routines to handle system queue overflow during a database print job.

The above description is one particular embodiment of the present invention. Modifications and substitutions of elements described herein by one skilled in the art are within the scope of the present invention, which is not to be limited except by the claims which follow.

We claim:

APPENDIX I 3.0.2 Top Level Pseudocode

The overall operation of the TM can be described by the following pseudocode:

```
Initialize necessary variables for the TM.
Do forever:
    Wait for a message.
    If the message is from the CI then
       process specified command
    else if the message is from TB, TP or PH then
       report appropriate alarm
    else
       report system error.
```

Notes:

* CI messages are commands to the TM
* TP messages are transaction alarms
* TB messages are tape alarms
* PH messages are printer alarms 3.0.3 Command Processing Pseudocode This pseudocode describes what happens when the TM receives a command from the CI. Note that while waiting for any input at the keyboard, the TM checks for alarms or commands from the other system tasks.

```
Message received from CI.
    If output to display screen needed then
       call output routine
    If input from operator needed then
       begin
         while no input, check for messages
```

TERMINAL MANAGER PSEUDOCODE

```
         if message received then execute it.
       end.
    return input data.
Send response message to CI.
```

APPENDIX II 1.2 HIGH LEVEL PSEUDOCODE

The top level module of the DATA MANAGER named DMMAIN can be expressed by the following psuedocode.

```
    Get initialization data from the Initialization Module.

    Do forever:
        wait for input mail message from Transaction Processor
              or Command Interpreter.
DATA MANAGER MODULE STRUCTURE AND DESIGN


        If the message is from the Command Interpreter then
         do the following:

              Process and decode the message.
              Free up the message area.
              If it is a valid message, call INTERPRT to
                interpret and execute the messagee.

              Send a return message to the Command Interpreter.

        that all!

        If the message is from the Transaction Processor then
         do the following:

              Process and decode the message.
              Free up the message area.
              If it is a valid message, call INTERPRT to
                interpret and execute the message.

              Send a return message to the Transaction
                Processor.
        that all!

    CONTINUE LOOPING FOREVER
```

1.3 SECOND LEVEL PSEUDOCODE

The actual interpretation of input messages is performed by procedure INTERPRT, which can be expressed in psuedocode as:

```
PROCEDURE INTERPRT

  If the MTYPE in the message is valid, do the following:
```

```
According to the Message Type (MTYPE) of the Input mail
 message, do the following:

2  IF MTYPE IS:          THEN PERFORM PROCEDURE:
   -----------           ---------------------

    CARD                  DOCARD

    CARD by CARDLABEL     DOCARDLABEL or DO2CARDLABEL, depending
                           on the value of variable FLAG (exact
                           match or next highest).

    CARD by MONITOR       DOCRDMONITOR

    CARD by USELIMIT      DOCARDUSELIMIT
DATA MANAGER MODULE STRUCTURE AND DESIGN

    CARD by LASTRDR       DOCARDREADER

    CARD by GROUP         DOCARDGROUP

    CARD by KEYCODE       DOCARDKEYCODE

    CARD by INDEX         DOCARDINDEX

    RDRATT                DOREADRATT

    GROUP                 DOGROUP

    TEMPKEYCODE           DOTEMP or DOTEMPKEYCODE depending on
                           the value of variable FLAG(exact match
                           or next highest).

    TEMP by ID            DOTEMPID or DOTMPID depending on the
                           value of variable FLAG (exact match
                           or next highest).

    PASSWORD              DOPASSWORD

    PASS by ID            DOPASSID

    TEMPORARY KEYCODE
     by GROUP             DOTEMPGROUP

    TEMPORARY KEYCODE
     by EXPIRATION
        DATE              DOTEMPDATE

    TEMPORARY KEYCODE
    by INDEX              DOTEMPINDEX

   END
   END PROCEDURE INTERPRET
```

APPENDIX III 6.0.1 Top Level Pseudocode

The overall operation of the TP can be described by the following pseudocode:

```
Initialize the PM and the TP.
Do forever:
    Wait for a message.
    If the message is from the CI, process it.
    If the message is from the DM, process it.
    If the message is from the PM, process it.
```

Notes:

TRANSACTION PROCESSOR PSEUDOCODE

- o CI messages regulate polling and request "test mode" information
- o DM messages supply transaction information
- o PM messages initiate transactions, report reader conditions, and supply "test mode" responses 6.0.2 Transaction Processing Pseudocode This pseudocode describes transaction processing. Note that while between "steps" of a transaction, the TP is waiting for a response from either the DM or the PM, and is off doing other things: reading other messages, processing other transactions, etc.

6.0.2.1 Keycode-Based Transaction -

```
Step 1:  Initiated by the PM message "KEYCODE presented at READER".

         Ask the DM for the Reader Record for this reader.

Step 2:  The DM has responded.

         If there is no such record, then
            (something is amiss)
            Send "Invalid Access" message to the PM,
            Send an alarm message to the TM,
            Cancel the transaction
         else
            If antipassback is on, then
                Send "Invalid Access" message to the PM,
                Send an alarm message to the TM,
                Cancel the transaction
            else
                Ask the DM for the Temporary Pass Record for the
                keycode presented.
```

```
Step 3:  The DM has responded.

         If there is no such record, then
            Send "Invalid Access" message to the PM,
            Send an alarm message to the TM,
            Cancel the transaction
         else
            Ask the DM for the first Group Record on the user's
         grouplist.

Step 4:  The DM has responded.

         If there is no such record, then
            (something is amiss)
            Send an alarm message to the TM,
```

TRANSACTION PROCESSOR PSEUDOCODE

```
            Cancel the transaction
         else
            If, according to the Group Record, the reader, time
                of day, and day of week are all legal, then
                (grant access)
                Send a "Valid Access" message to the PM
            else
                If there is another Group listed on the user's
                    grouplist,
                    Ask the DM for that Group Record,
                    Next step is Step 4
                else
                    Send an "Invalid Access" message to the PM,
                    Send an alarm message to the TM,
                    Cancel the transaction.

Step 5:  The PM has responded.

         If the user went through the door, then
            Send an informational message to the TM,
            Record this transaction as finished
         else
            Send an alarm message to the TM,
            Record this transaction as finished.
```

APPENDIX IV

2.1 HIGH LEVEL PSEUDOCODE

The top level module of the TS named TSRMAIN can be expressed as follows:

```
BEGIN

    WHILE FOREVER DO

    BEGIN
```

```
        Wait for input mail message from the Command Interpreter.

        If message is to perform a BACKUP
              then DOBACKUP

        Else if message is to perform a RESTORE
              Then DORESTORE.

    END

END
```

2.1.1 DOBACKUP PSEUDOCODE

Procedure DOBACKUP can be expressed as:

```
BEGIN
TAPE BACKUP/RESTORE STRUCTURE

    Send an initialization of track 0 to the Tape Handler.

    Backup Size information to tape.

    Backup CARD information to tape.

    Send an initialization of track 1 to the Tape Handler.

    Backup READER information to tape.

    Backup GROUP information to tape.

    Backup KEYCODE information to tape.

    Backup PASSWORD information to tape.

    Backup HOLIDAY information to tape.

    Send an UNLOAD message to the Tape Hander.

    According to who sent the original Backup message,
        send a reply back, either GOOD or BAD execution.

END
```

2.1.2 DORESTORE PSEUDOCODE

Procedure DORESTORE can be expressed as:

```
BEGIN

    Send an initialization of track 0 to the Tape Handler.

    Restore Size information from tape.

    Send an Initialization message to the DM.

    Restore CARD information from tape.

    Send an initialization of track 1 to the Tape Handler.

    Restore READER information from tape.

    Restore GROUP information from tape.

    Restore KEYCODE information from tape.

    Restore PASSWORD information from tape.

    Restore HOLIDAY information from tape.

    Send an UNLOAD message to the Tape Handler.
TAPE BACKUP/RESTORE STRUCTURE


    According to who sent the original RESTORE message,
        send a reply back, either GOOD or BAD execution.

END
```

APPENDIX V

The code in Ph1 includes:

- o the main routine (ie top-level loop in PH)
- o routines to handle the printing of the system log
- o routines to handle database printouts
- o routine to handle Printer Spooler error conditions
- o routines to send acknowledgements to the Printer Spooler
- o routines to handle System Queue overflow during a database print job 4.0.2 Top Level Pseudocode The overall operation of the PH can be described by the following pseudocode:

```
Initialize necessary variables for the PH.
Do forever:
    If System Queue not over 80% full then
       begin
          Check for a message from the Printer Spooler.
          If there is a message then
             Print Database job.
          Else
             Print current System Queue item.
       end
    Else
       Print current System Queue item.
```

PRINTER HANDLER PSEUDOCODE 4.0.3 Database Command Processing Pseudocode

This pseudocode describes what happens when the PH receives a database print job from the Printer Spooler.

```
Message received from Printer Spooler.
If message is Start Database Print Job then
   Print database header.
else
   Print error.
Wait for message from Printer Spooler.
while message is a database record
   begin
     Print out database record.
     Wait for message from Printer Spooler.
   end
If message is End Database Print Job then
   Print database end message.
else
   Print error.
```

APPENDIX VI

COMMAND INTERPRETER OPERATION 5.0.0.2 Top Level Pseudocode - The overall operation of the CI can be described by the following pseudocode:

```
Initialize the CI.
Do forever:
    If there is a message to the CI from another module,
         Perform the next 'step' of processing.
    Check the time, and perform any necessary time-dependent
         tasks.
```

1. An access control system, comprising:
a plurality of remote stations;
a central station; and
a data bus connected to said plurality of remote stations, wherein
said central station includes:
means for polling said remote stations, connected to said data bus to transmit to and receive data from a selected plurality of remote stations, wherein
said means for polling is responsive to an interrupt signal to commence transfer of data on said data bus and is responsive to a count signal providing an indication of the quantity of data to be transferred;
means for controlling said plurality of remote stations connected to said means for polling, and
a plurality of FIFO data registers connected to said means for polling and said remote stations to provide access control at said plurality of remote stations by said means for controlling, wherein
one of said plurality of FIFO data registers provides said interrupt signals to said means for polling to initiate receipt of data into said means for polling, and provides said count signal.

2. The access control system of claim 1 wherein
each said FIFO data register provides a sequence of data units, each data unit comprising a plurality of data bits.

3. The access control system of claim 2, wherein
said FIFO data unit is a byte including eight bits of data.

4. The access control system of claim 2 wherein
said data unit includes a flag bit, and at least one of said means for polling and said remote unit includes means to detect said flag bit.

5. The access control system of claim 4, wherein
said means to detect said flag bit provides a signal indicating the presence of new data in said FIFO data register.

6. The access control system of claim 4, wherein said count signal indicates the number of subsequent data bytes, and includes a flag bit;
and each said remote station communicates with said means to detect said flag bit and produces an error signal when new data is indicated and the number of said data units is less than the number indicated by said count signal.

7. The access control system of claim 4, wherein
said remote unit communicates with said means to detect said flag bit and receives data from one of said FIFO data registers when new data is indicated and the number of data units equals said selected plurality.

8. The access control system of claim 1, wherein
said plurality remote stations and said means to poll provides asynchronous communication therebetween.

9. The access control system of claim 8, wherein
the communication between said remote stations and said means to poll comprises an RS422 compatible communication format, said remote units being connected in parallel thereto.

10. The access control system of claim 1, wherein
said access control system is operable according to a degraded mode, whereupon failure of the respective remote station to receive data from said means for controlling, a grant of access to the user is provided according to a subset of information stored locally within said remote station retaining said subset of information without assist of battery backup power units.

11. The access control system of claim 10, wherein said console includes a backup means to selectively store said database upon command of the console operator.

12. The access control system of claim 11, wherein
said console receives said stored data after a power fail and power-up restart condition upon command by the console operator.

13. The access control system of claim 11, wherein console further includes a FIFO data register providing data transfer between said console and said remote stations.

* * * * *

UNITED STATES PATENT AND TRADEMARK OFFICE

CERTIFICATE OF CORRECTION

PATENT NO. : 4,839,640

DATED : June 13, 1989

INVENTOR(S) : Richard Ozer et al.

It is certified that error appears in the above-identified patent and that said Letters Patent is hereby corrected as shown below:

Drawings, Fig. 2, far left, top half, insert vertically --TO MULTIBUS/ιSBC 86--. See attached Fig. 2.

Column 3, line 11, "hardward 50" should read --hardware 50--.

Column 3, line 20, "a additional" should read --an additional--.

Column 5, line 24, "car" should read --card--.

Column 7, line 25, "0-32,767" should read --0-32767--.

Column 8, line 40, "ON and" should read --ON or--.

Column 8, line 45, "If is" should read --It is--.

Column 9, line 52, "door left" should read --doors left--.

Column 9, line 63, "communication" should read --communications-

Column 9, line 67, "detacted" should read --detected--.

Column 11, line 9, "not alarm," should read --no alarm,--.

Column 12, line 51, "reacer" should read --reader--.

Column 13, line 67, "If buffers" should read --It buffers--.

Column 18, line 10, "checks if" should read --checks it--.

Column 24, line 33, "fitted" should read --filtered--.

Column 24, line 62, "case an" should read --case sends an--.

Column 26, line 9, "error;" should read --errors;--.

UNITED STATES PATENT AND TRADEMARK OFFICE

CERTIFICATE OF CORRECTION

PATENT NO. : 4,839,640
DATED : June 13, 1989
INVENTOR(S) : Richard Ozer et al.

It is certified that error appears in the above-identified patent and that said Letters Patent is hereby corrected as shown below:

Column 26, line 16, "character is" should read --character in--.

Column 26, line 66, "the then" should read --and then--.

Column 27, line 4, "wall" should read --will--.

Column 27, line 24, "Presented,"" should read --Presented."--.

Column 27, line 57, "tap unit" should read --tape unit--.

Column 30, line 26, "charge" should read --change--.

Column 32, line 21, "byte have" should read --byte, have--.

Column 32, lines 21-22, "re- ceived if" should read --re- ceived, if--.

Column 32, line 24, "go the" should read --go to the--.

Column 32, line 68, "bit us" should read --bit is--.

Column 33, line 1, "that start" should read --the start--.

Column 33, line 4, "bidirectiona ldata" should read --bidirectional data--.

Column 33, line 57, "singal$interrupt" should read --signal$interrupt--.

Column 35, line 25, "is used issued," should read --is issued,--

UNITED STATES PATENT AND TRADEMARK OFFICE

CERTIFICATE OF CORRECTION

PATENT NO. : 4,839,640

DATED : June 13, 1989

INVENTOR(S) : Richard Ozer et al.

It is certified that error appears in the above-identified patent and that said Letters Patent is hereby corrected as shown below:

Column 35, line 53, "tap" should read --tape--.

Signed and Sealed this

Thirteenth Day of August, 1991

*Attest:*

HARRY F. MANBECK, JR.

*Attesting Officer*

*Commissioner of Patents and Trademarks*